US007860280B2

(12) United States Patent
Danowitz

(10) Patent No.: US 7,860,280 B2
(45) Date of Patent: Dec. 28, 2010

(54) FACIAL FEATURE DETECTION METHOD AND DEVICE

(75) Inventor: Jeffrey Danowitz, Tel-Aviv (IL)

(73) Assignee: Samsung Electronics Co., Ltd., Gyeonggi-do (KR)

(*) Notice: Subject to any disclaimer, the term of this patent is extended or adjusted under 35 U.S.C. 154(b) by 1237 days.

(21) Appl. No.: 11/449,849

(22) Filed: Jun. 9, 2006

(65) Prior Publication Data

US 2007/0286490 A1  Dec. 13, 2007

(51) Int. Cl.
*G06K 9/00* (2006.01)
*G06K 9/66* (2006.01)

(52) U.S. Cl. .................................. 382/118; 382/195

(58) Field of Classification Search .................. 382/118, 382/195

See application file for complete search history.

(56) References Cited

U.S. PATENT DOCUMENTS

| | | | |
|---|---|---|---|
| 5,835,616 | A | 11/1998 | Lobo et al. |
| 6,697,502 | B2 | 2/2004 | Luo |
| 6,885,761 | B2 | 4/2005 | Kage |
| 2004/0167390 | A1* | 8/2004 | Alexander et al. .......... 600/410 |
| 2004/0228504 | A1* | 11/2004 | Chang ......................... 382/118 |
| 2005/0146539 | A1* | 7/2005 | Zhu et al. ................... 345/639 |
| 2005/0190913 | A1* | 9/2005 | Wada et al. .................. 380/44 |
| 2005/0286793 | A1* | 12/2005 | Izumi et al. ................. 382/263 |
| 2006/0029265 | A1 | 2/2006 | Kim et al. |
| 2006/0274956 | A1* | 12/2006 | Sohn et al. .................. 382/238 |

OTHER PUBLICATIONS

Saber, E.; Tekalp, A.M., Face detection and facial feature extraction using color, shape and symmetry-base cost function. Proceedings of the 13th International Conference on Pattern Recognition, vol. 3, pp. 654-658, Aug. 25-29, 1996.*
Hu, J.; Wang, H., Adaptive Total Variation Based on Feature Scale. World Academy of Science, Engineering and Technology, 2 2005.*
Huang et al. "Driver Head Pose and View Estimation With Single Omnidirectional Video Stream", Proceedings of the 1st International Workshop on in-Vehicle Cognitive Computer Vision Systems: 44-51, 2003.
KW Wong et al. "An Efficient for Human Face Detection and Facial Feature Extraction Under Different Conditions", Pattern Recognition, 34:1993-2004, 2001.
Lin et al. "Locating the Eye in Human Face Images Using Fractal Dimensions", IEE Proc.-Vis. Image Signal Process, 148(6):413-421, 2001.

(Continued)

*Primary Examiner*—Charles Kim
*Assistant Examiner*—Nirav G Patel

(57) ABSTRACT

A method for facial feature detection. The method comprises the following steps: a) receiving a digital image depicting a human face, the digital image comprising a plurality of color pixels, each one of the color pixels comprising color information, b) segmenting a face segment based on the color information, the face segment delimiting the area of the face, c) identifying a centerline that approximately bisects a human face section, and d) using the centerline to segment a set of facial features of the human face.

42 Claims, 18 Drawing Sheets
(15 of 18 Drawing Sheet(s) Filed in Color)

}

OTHER PUBLICATIONS

Park et al. "Algorithm for Detecting Human Faces Based on Convex-Hull", Optics Express, 10(6):274-279, 2002.

Schmidt Feris et al. "Facial Feature Detection Using A Hierarchical Wavelet Face Database", University of Maryland, 2002.

Shih et al. "Automatic Extraction of Head and Face Boundaries and Facial Features", Information Sciences, 158:117-130, 2004.

Sung et al. "Example-Based Learning for View-Based Human Face Detection", A.I. Memo No. 1521, C.B.C.L. Paper No. 112, p. 1-20, 1994.

Tankus et al. "Face Detection by Direct Convexity Estimation", Pattern Recognition Letters, 18:913-922, 1997.

Wang et al. "Facial Feature Point Extraction by Partial Least Square Regression", Elsevier Science, 2002.

Yang et al. "Detecting Faces in Images: A Survey", IEEE Transactions on Pattern Analysis and Machine Intelligence, 24(1):34-58, 2002.

Yi et al. "Face Boundary Extraction", Proc. VIIth Digital Image Computing: Techniques and Applications, p. 947-956, 2003.

Yow et al. "Feature-Based Human Face Detection", Department of Engineering University of Cambridge, p. 1-26, 1996.

* cited by examiner

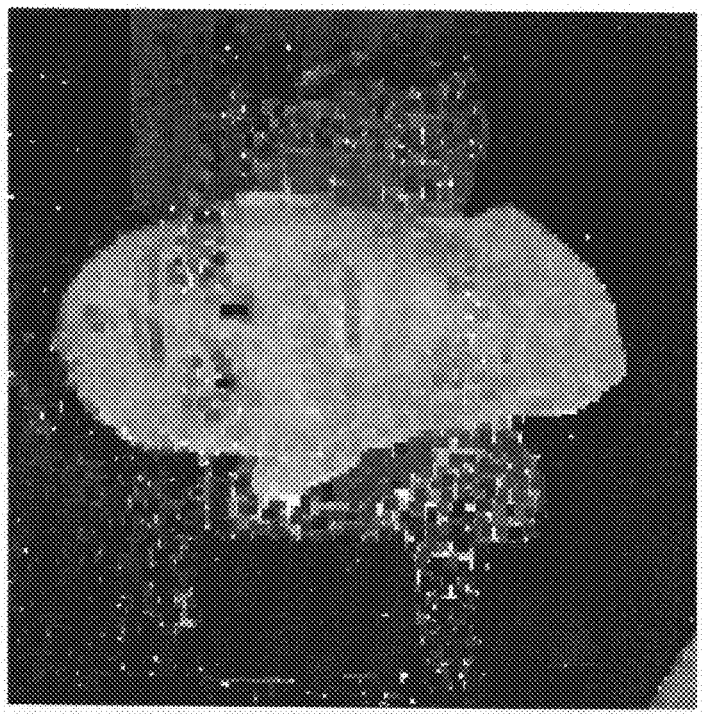
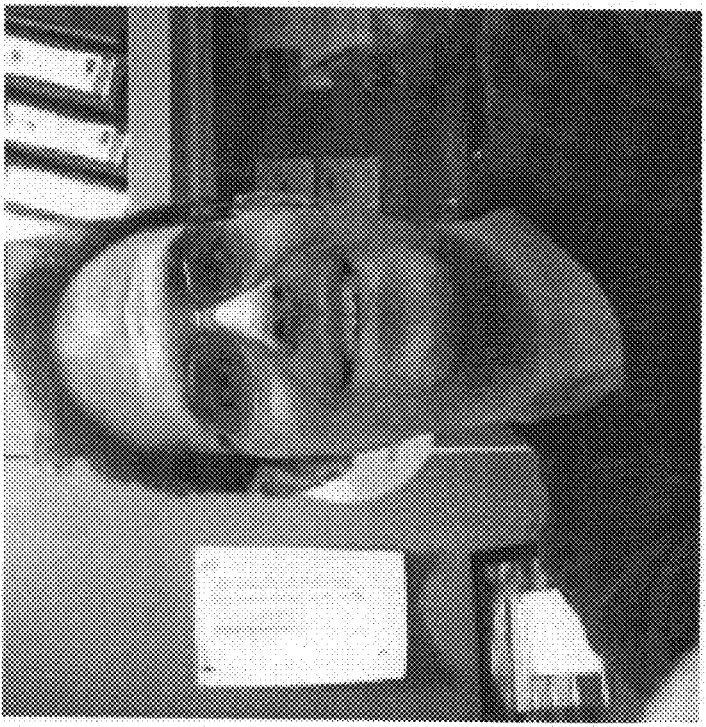
FIG. 2A
FIG. 2B

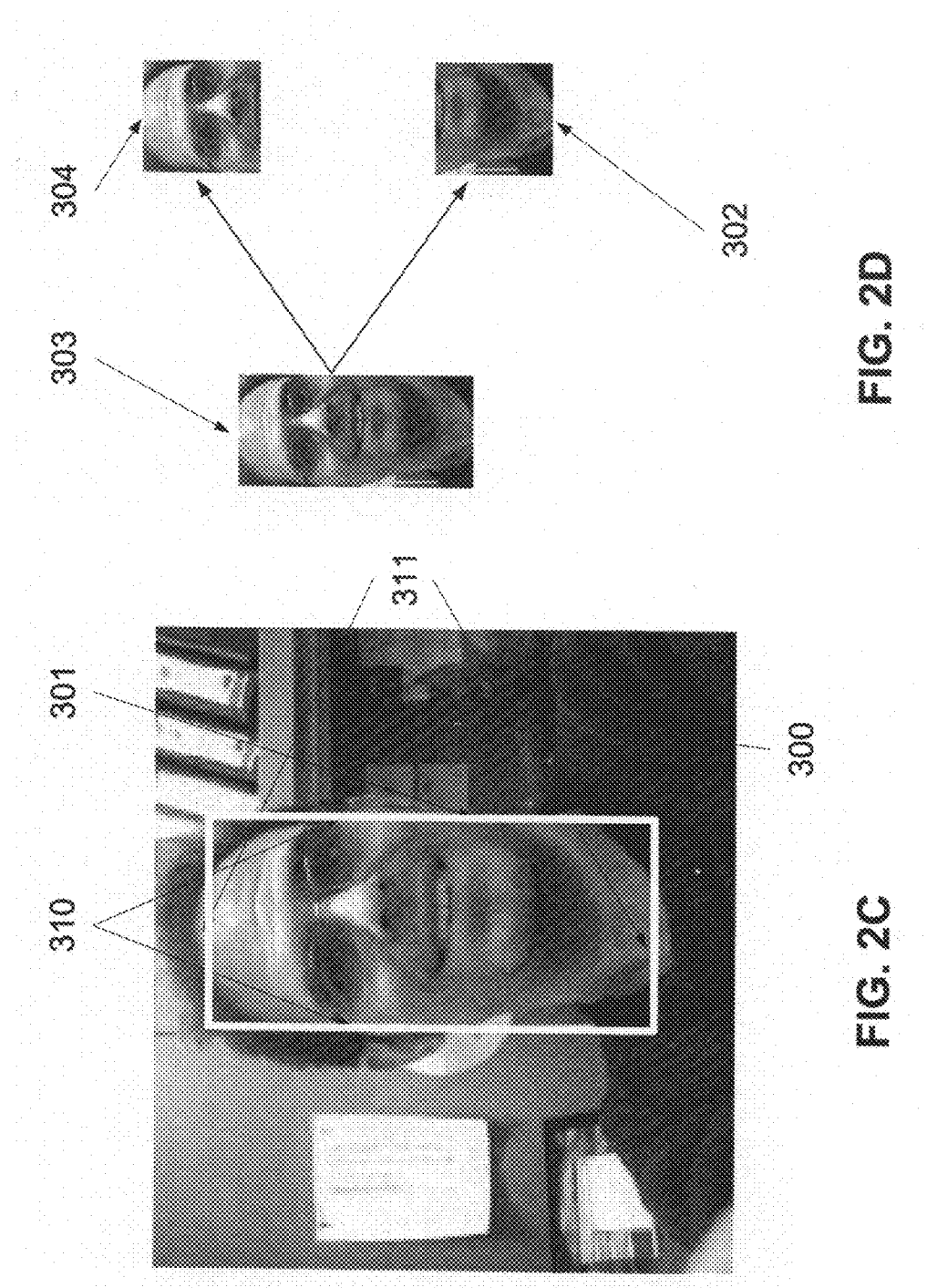

FACIAL FEATURE DETECTION METHOD AND DEVICE

FIELD AND BACKGROUND OF THE INVENTION

The present invention relates to a method and device for facial feature detection.

During the last decade, the field of face detection and facial feature detection has been constantly evolving. Face detection and facial feature detection have become popular areas of research in the field of computer vision and a basis for more complicated applications such as face recognition.

For example, in order to initiate the process of face recognition, usually the face first has to be detected. Clearly, an accurate detection of human faces in arbitrary scenes is a basic step in the process. Accurate detection of human faces for the input of digital images would enable many beneficial applications. Face recognition applications are just one example of applications that rely on face detection. However, other applications are also known. For example, in order to focus an image to be photographed, automatic and semi-automatic focusing cameras often focus on a portion of a scene. If the camera were able to locate faces in the scene, then the focus could be optimized for the faces, unless the photographer decides otherwise. An accurate detection of facial features may enable other beneficial applications and reduce the computational complexity of complex applications such as face recognition.

During the last few years, face detection has been studied in relation to the subject of image understanding. However, face detection remains an area with high computational requirements, particularly if an accurate recognition of the face outline and facial features is needed.

One example of a known face detection method is disclosed in U.S. Pat. No. 5,835,616, issued on Nov. 11, 1998. The patent discloses a two-step process for automatically identifying a human face in an electronically digitized image (for example, taken by a handheld, digital camera or a digital video-camera such as a camcorder), and for confirming the existence of the face in the image by examining facial features. Step 1 is, to detect the human face, is accomplished in stages that include enhancing the digital image with a blurring filter and edge enhancer in order to better distinguish the unique facial features such as wrinkles and curvature of the facial image. After prefiltering, preselected curves sometimes referred to as snakelets are superimposed on the image where they become aligned with the natural wrinkles and curves of the facial image. Step 2, to confirm the existence of a human face, is done in seven stages by finding facial features of the digital image encompassing the chin, sides of the face, virtual top of the face, eyes, mouth and nose. Ratios of the distances between these found facial features can be compared to previously stored reference ratios for facial recognition.

However, this method, as many other methods which are known in the face detection field, is computationally expensive and demands a substantial amount of memory allocation. In particular, since the size of the face (and the features therewithin) relative to the size of the digital image are not always known, the face detection process has to include repetitive search steps. The high number of iterations makes such a search computationally expensive. Moreover, the search has to include steps of matching the potential face or potential facial features with different translational, rotational, and scaling parameters. The matching requires the allocation of even more memory. In addition, such a technique requires a database of faces and/or facial features for the searching. Maintaining this database on a mobile telephone, for example, requires substantial amount of memory allocation.

One of the challenges in the field is to implement face detection methods in a computing unit with limited memory resources, and with limited computational abilities. A method that performs face detection and facial feature detection with low computational complexity is usually different from other face detection and recognition methods. In particular, the algorithms used, the limited memory and the character of the input digital image are different. In order to avoid high computational complexity when using computing units with limited memory and computational power, a few methods that do not use complex databases and algorithms have been developed.

One such method is disclosed in U.S. Pat. No. 6,697,502, issued on Feb. 24, 2004. The patent discloses a digital image processing method for detecting human figures in a digital color image. The first step of the disclosed method is providing a digital color image having pixels representing Red-Green-Blue (RGB) values. The second step is segmenting the image into non-overlapping regions of homogeneous color or texture. The following step is detecting candidate regions of human skin color and detecting candidate regions of human faces. Then, for each candidate face region, a human figure is constructed by grouping regions in the vicinity of the face region according to a predefined graphical model of a human figure, giving priority to human skin color regions.

U.S. Pat. No. 6,885,761 issued on Apr. 26, 2005 discloses a portable device which is adapted to identify human faces. The device includes an image input section which picks up a two-dimensional image containing a person's face, using an image sensor. A face area extracting section extracts the image of the face of the person from the image. A feature detection section detects the position of characteristic feature(s) of the face of that person. A face outline determining section determines a border between a face outline and a background. An image processing section generates a person's portrait in which the characteristic feature(s) of the face is emphasized.

Both U.S. Pat. No. 6,885,761 and U.S. Pat. No. 6,697,502 describe methods that can easily be used to detect human faces in a given digital image. However, the described methods cannot efficiency detect the facial features that comprise the detected face.

There is thus a widely recognized need for, and it would be highly advantageous to have, an apparatus and a method for face and facial feature detection for a computing unit with limited memory and computational power which are devoid of the above limitations.

SUMMARY OF THE INVENTION

According to one aspect of the present invention there is provided a method for facial feature detection. The method comprises the following steps: a) receiving a digital image comprising a human face section, the digital image comprising a plurality of pixels, each one of the pixels comprising color information, b) using symmetry within the human face section to identify a centerline to substantially bisect a human face region within the human face section, and using the centerline as a locator to segment facial feature regions of the human face section.

Preferably, the color information represents hue level of a related field of view.

Preferably, the lateral borders of the human face section are determined based on the hue level of the pixels of each column of the digital image.

More preferably, the upper and lower borders of the human face section are determined based on the hue level of the pixels of each row of the digital image.

More preferably, the method further comprises a step between the step (b) and the step (c) of preparing a morphological map of the human face section based on the color information of the plurality of pixels, and the segmenting the facial feature regions comprises using the morphological map.

More preferably, the color information comprises Red-Green-Blue (RGB) color coordinates, the method further comprises a step (a1) between the step (a) and the step (b) of converting the color information from RGB color coordinates to one member of the group consisting of: Hue-Saturation-Value (HSV) color coordinates, CIE L*a*b* (CIELAB) color coordinates and YCbCr color coordinates.

Preferably, the method further comprises a step between the step (a1) and the step (b) of preparing a new digital image by shifting a contrast filter to scan an overall region of the digital image while changing the level of the color information at a predetermined rate.

Preferably, the identifying in step (b) comprises the following steps:
i) separately analyzing the color information of each column of pixels of the digital image, ii) separately analyzing the color information of each row of pixels of the digital image, and iii) using the outcome of the step (i) and the step (ii) to identify the human face section.

Preferably, the centerline is iteratively defined by adopting one of a plurality of lines that most symmetrically divide the human face section.

Preferably, the adopting one of a plurality of lines comprises:
defining a pair of corresponding frames for each one of the plurality of lines wherein, for each line, each pair of corresponding frames delimits a pair of areas of pixels from opposite sides of a respective line,
comparing the two corresponding frames of each one of the plurality of potential lines to determine a symmetry level value, and
using the symmetry level value of each one of the plurality of potential lines to identify the centerline.

Preferably, the centerline of step (c) is identified according to the following steps: i) segmenting a side template from a first side of the human face section, ii) generating a mirrored side template based on the side template, iii) matching the mirrored side template to at least one equally shaped area from another portion of the human face section, and iv) using the positioning of the side template and the mirrored side template to identify the centerline.

More preferably, the method further comprises a step b1) between the step (b) and the step (c) of generating a Gray Level Morphological Deep Map (GMDM) based on the human face section.

More preferably, the method further comprises a step between the step (b1) and the step (c) of generating a Binary Morphological Deep Map (BMDM) based on the GMDM.

More preferably, the segmenting of step (c) is done using the GMDM.

More preferably, the segmenting of step (c) is performed according to the following steps: i) separately analyzing the color information of each row of pixels of the human face section, ii) using the outcome of the step (i) to identify a set of potential facial feature strips, iii) separately analyzing the color information of each column of pixels of the set of potential facial feature strips, and iv) using the outcome of the step (iii) to identify at least one facial feature segment that delimits the area of a facial feature.

According to another aspect of the present invention there is provided a method for facial feature detection. The method comprises: a) receiving a digital image, the digital image comprising a plurality of color pixels, each one of the color pixels comprising color information, b) identifying a candidate face region based on the color information, c) using symmetry within the candidate face region to identify a centerline to substantially bisect a human face section within the candidate face region, and d) using the centerline as a locator to segment facial feature regions of the human face section.

Preferably, the color information represents hue level of a related field of view. Preferably, the lateral borders of the candidate face region are determined based on the hue level of the color pixels of each column of the digital image.

Preferably, the upper and lower borders of the candidate face region are determined based on the hue level of the color pixels of each row of the digital image.

Preferably, the method further comprises a step between the step (c) and the step (d) of preparing a morphological map of the face segment based on the color information of the plurality of color pixels, and the segmenting the facial feature regions comprises using the morphological map.

Preferably, the color information comprises Red-Green-Blue (RGB) color coordinates, the method further comprises a step (a1) between the step (a) and the step (b) of converting the color information from RGB color coordinates to one member of the group consisting of: Hue-Saturation-Value (HSV) color coordinates, CIE L*a*b* (CIELAB) color coordinates and YCbCr color coordinates.

More preferably, the method further comprises a step between the step (a1) and the step (b) of preparing a new digital image by shifting a contrast filter to scan an overall region of the digital image while changing the level of the color information at a predetermined rate.

More preferably, the identifying in step (c) comprises correlating between the values of respective columns of pixels in each one of the subimages.

Preferably, the identifying in step (b) comprises the following steps: i) separately analyzing the color information of each column of pixels of the digital image, ii) separately analyzing the color information of each row of pixels of the digital image, and iii) using the outcome of the step (i) and the step (ii) to identify a candidate face region that delimits the area of the face.

More preferably, the outcome of the analyzing is smoothed using a Total Variation (TV) smoothing filter.

More preferably, the identifying in step (b) comprises scanning the overall region of the digital image to identify a cluster of the color pixels that complies with a predefined rule.

More preferably, the predefined rule is one member of the group consisting of: a statistical rule, a dynamic rule, a static rule, a deterministic rule, and an event driven rule.

More preferably, the predefined rule defines pixels within a given range brightness level as facial skin pixels.

More preferably, the centerline is iteratively defined by adopting one of a plurality of lines that most symmetrically divide the human face section.

Preferably, the adopting one of a plurality of lines comprises:
defining a pair of corresponding frames for each one of the plurality of lines wherein, for each line, each pair of corresponding frames delimits a pair of areas of color pixels from opposite sides of a respective line, comparing the two corresponding frames of each one of the plurality of potential lines to determine a symmetry level value, and using the symmetry level value of each one of the plurality of potential lines to identify the centerline.

More preferably, the centerline of step (c) is identified according to the following steps: i) segmenting a side template from a first side of the face segment, ii) generating a mirrored side template based on the side template, iii) matching the mirrored side template to at least one equally shaped area from another portion of the face segment, and iv) using the positioning of the side template and the mirrored side template to identify the centerline.

More preferably, wherein matching of the mirrored side template to at least one equally shaped area is done using a normalized-correlation process.

More preferably, the method further comprises a step between the step (c) and the step (d) of generating a Gray Level Morphological Deep. Map (GMDM) based on the face segment.

More preferably, the method further comprises a step between the step (c) and the step (d) of generating a Binary Morphological Deep Map (BMDM) based on the GMDM.

More preferably, the segmenting of step (d) is done using the GMDM.

More preferably, the segmenting of step (d) is done using the BMDM.

More preferably, the segmenting of step (d) is performed according to the following steps:

i) separately analyzing the color information of each row of pixels of the face segment, ii) using the outcome of the step (i) to identify a set of potential facial feature strips, iii) separately analyzing the color information of each column of pixels of the set of potential facial feature strips, and iv) using the outcome of the step (iii) to identify at least one facial feature segment that delimits the area of a facial feature.

More preferably, the outcome of the step (ii) is smoothed using a TV smoothing filter.

Preferably, wherein the outcome of the step (iv) is smoothed using a TV smoothing filter.

Preferably, the color information is represented in gray level color space coordinates.

According to another aspect of the present invention there is provided a human facial feature finding device. The device comprises: an image input device having a connection to an image sensor, the image input device adapted to receive a digital image having color information from the image sensor, a face detection module adapted to identify a candidate face region based on the color information, a face bisector module adapted to use symmetry within the candidate face region to identify a centerline to substantially bisect a human face section within the candidate face region, and a facial feature detection module adapted to use the centerline to locate at least one facial feature segment, within the region of the human face section.

Preferably, the method further comprises a facial feature output device being adapted to output at least one subimage, each one of the at least one subimage defined according to a related the at least one facial feature segment.

Preferably, the image input device comprises a color space converter module.

More preferably, the color space converter module is adapted to convert the digital image which is represented in RGB color coordinates to a new digital image which is represented in HSV color coordinates.

More preferably, the color space converter module is adapted to convert the digital image which is represented in RGB color coordinates to a new digital image which is represented in YCbCr color coordinates.

Preferably, the image sensor comprises one of the following group members: a complementary metal oxide semiconductor (CMOS) sensor, and a charged coupled device (CCD) sensor.

Preferably, the method further comprises a morphological map module adapted to generate at least one morphological map based on the digital image, the facial feature detection module adapted to use the at least one morphological map to detect at least one facial feature segment, within the region of the human face section.

More preferably, the morphological map is a Gray Level Morphological Deep Map (GMDM).

More preferably, the morphological map is a Binary Morphological Deep Map (BMDM).

According to another aspect of the present invention there is provided a method for detecting facial feature areas using morphological map. The method comprises the following steps: a) receiving a digital image having a human face section, the digital image comprising a plurality of color pixels, each one of the color pixels comprising color information, b) generating a gray level image based on the plurality of color pixels, c) generating a Gray Level Morphological Deep Map (GMDM) based on the gray level digital image, and d) using the GMDM as a locator to segment facial feature regions of the human face section.

Preferably, the gray level image is based on the candidate face region.

Preferably, the method further comprises a step between the step (b) and the step (c) of using symmetry within the candidate face region to identify a centerline to substantially bisect a human face section within the candidate face region, the using of step d) is done using the centerline as a locator to segment facial feature regions of the human face section.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The file of this patent contains at least one drawing executed in color photograph. Copies of this patent with color photograph(s) will be provided by the Patent and Trademark Office upon request and payment of necessary fee.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

The file of this patent contains at least one drawing executed in color photograph. Copies of this patent with color photograph(s) will be provided by the Patent and Trademark Office upon request and payment of necessary fee.

Figure 1:
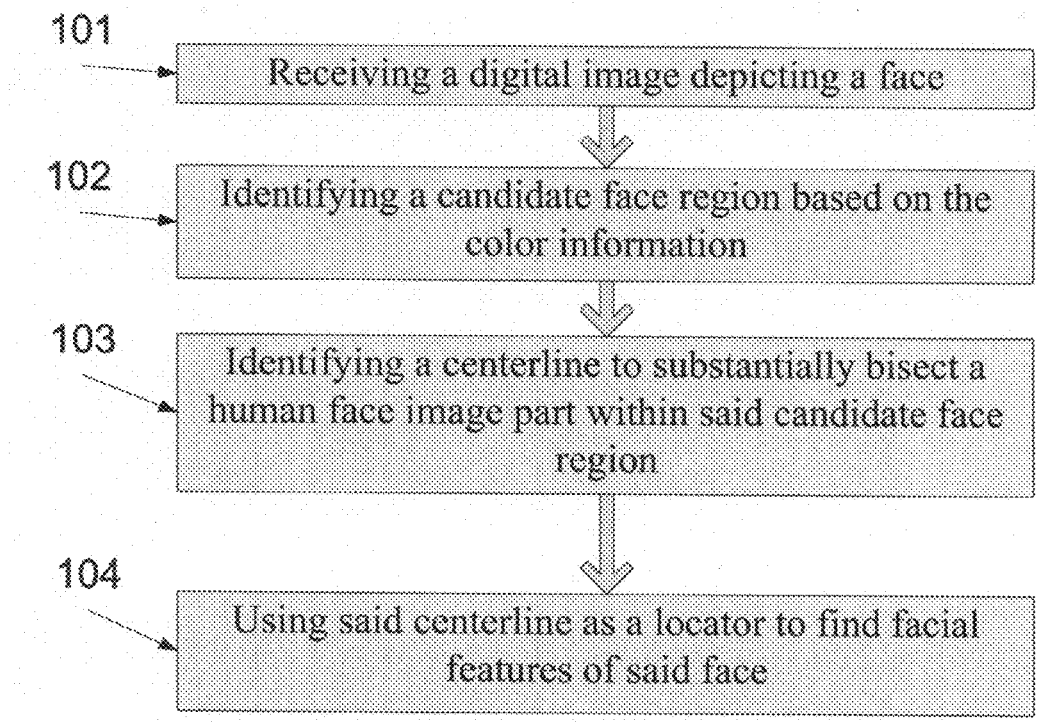
Figure 3B:
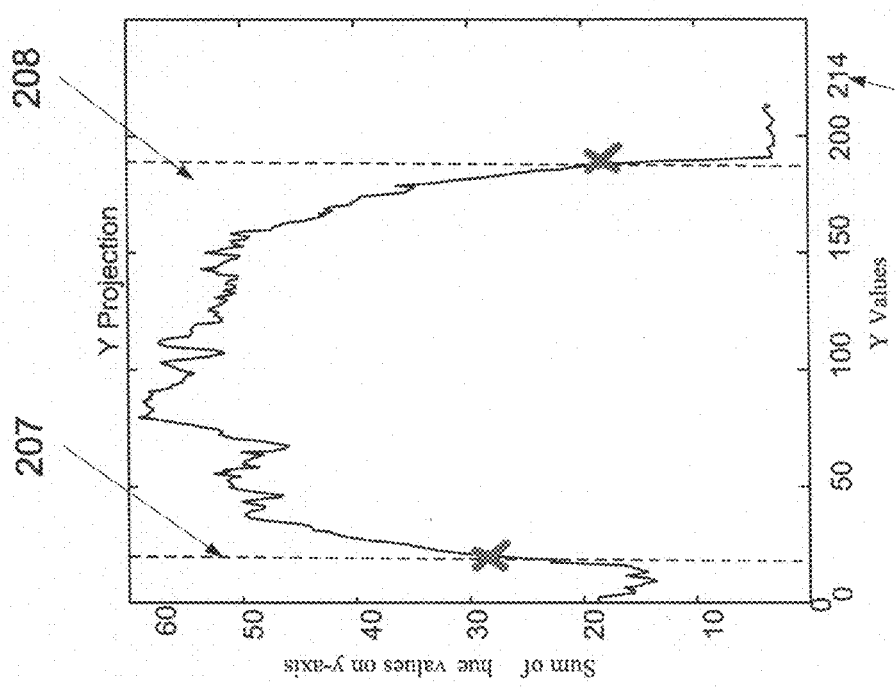
Figure 3A:
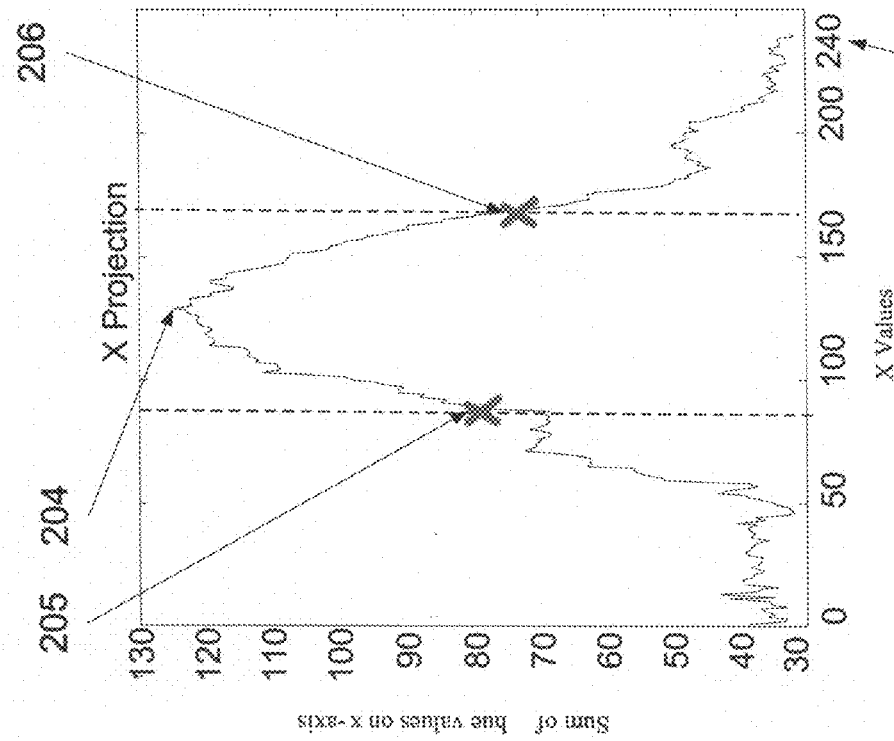
Figure 4B:
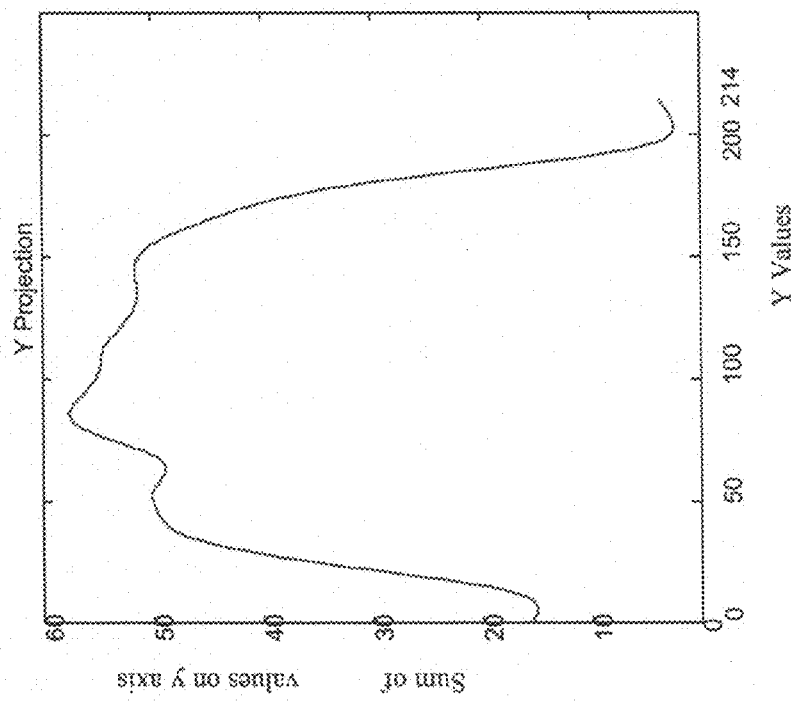
Figure 4A:
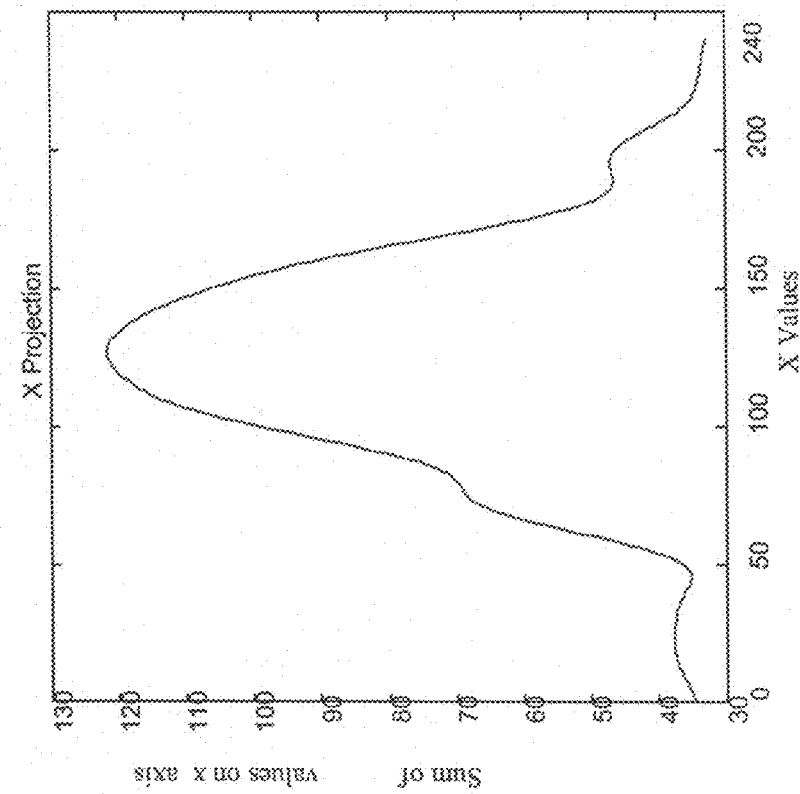
Figure 5:
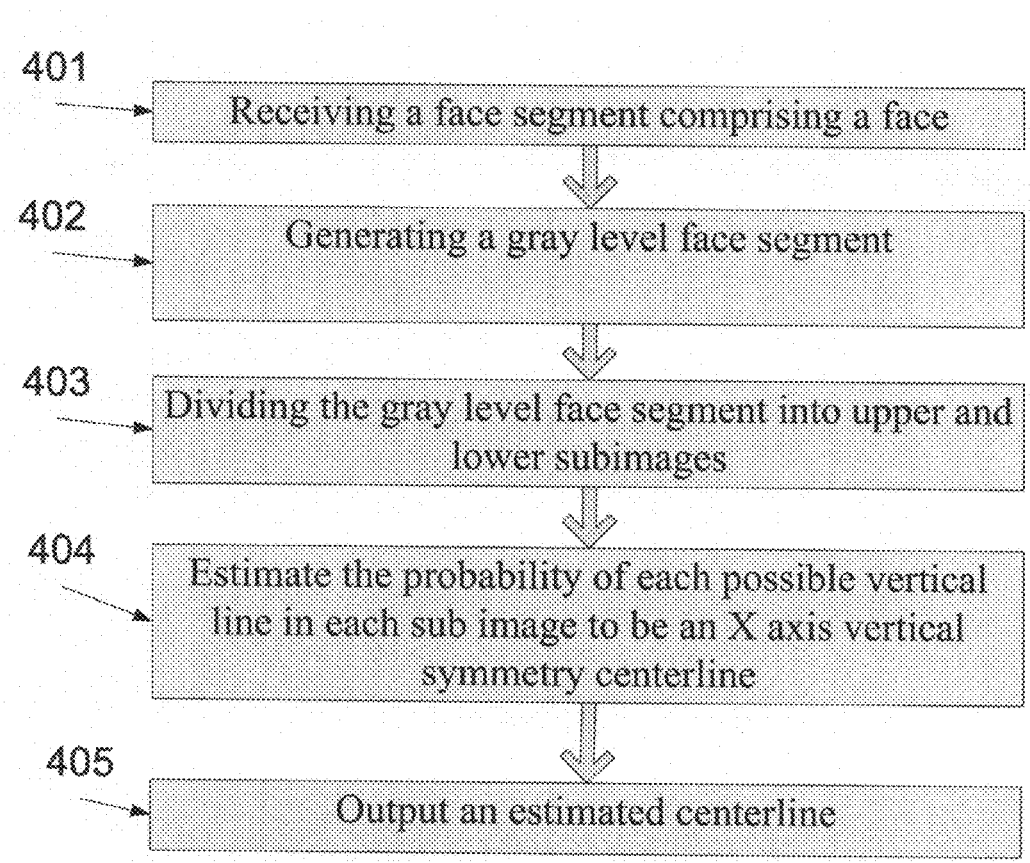
Figure 6C:
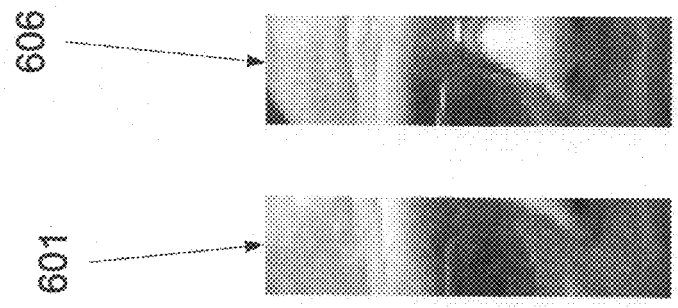
Figure 6B:
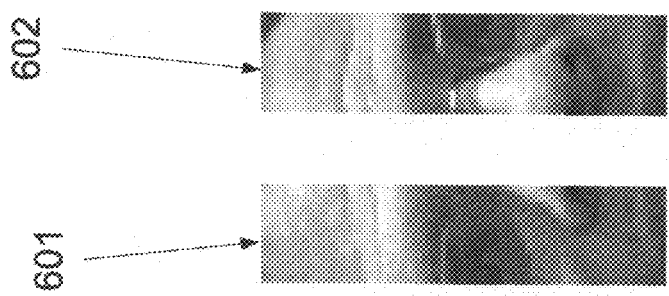
Figure 6A:
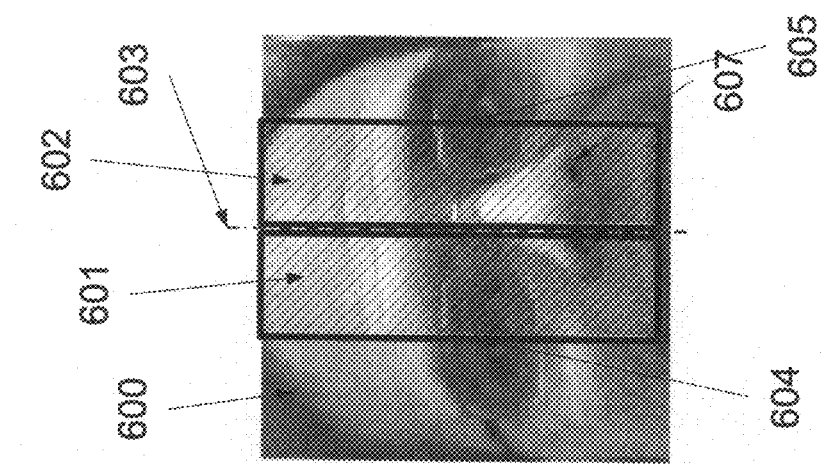
Figures 7A, 7B:
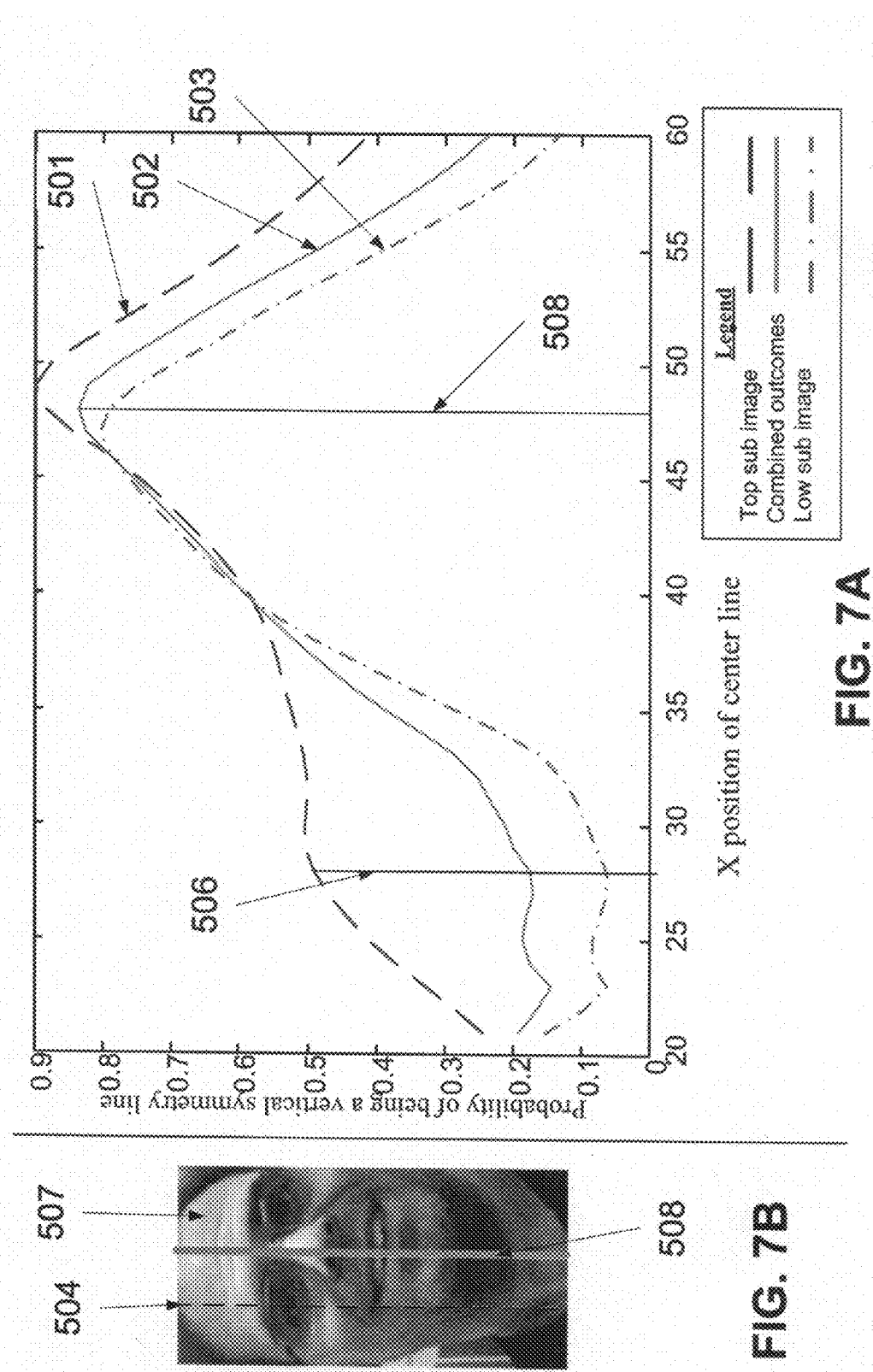
Figure 8:
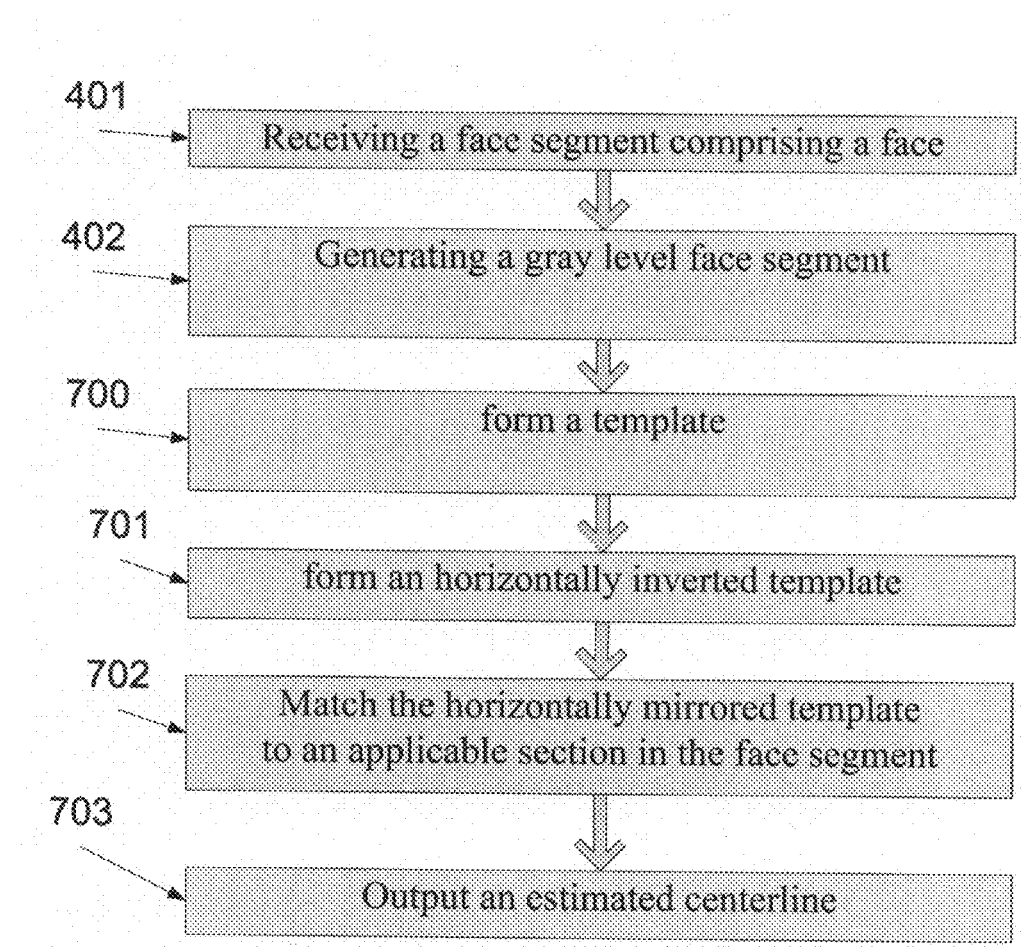
Figures 9A, 9B, 9C:
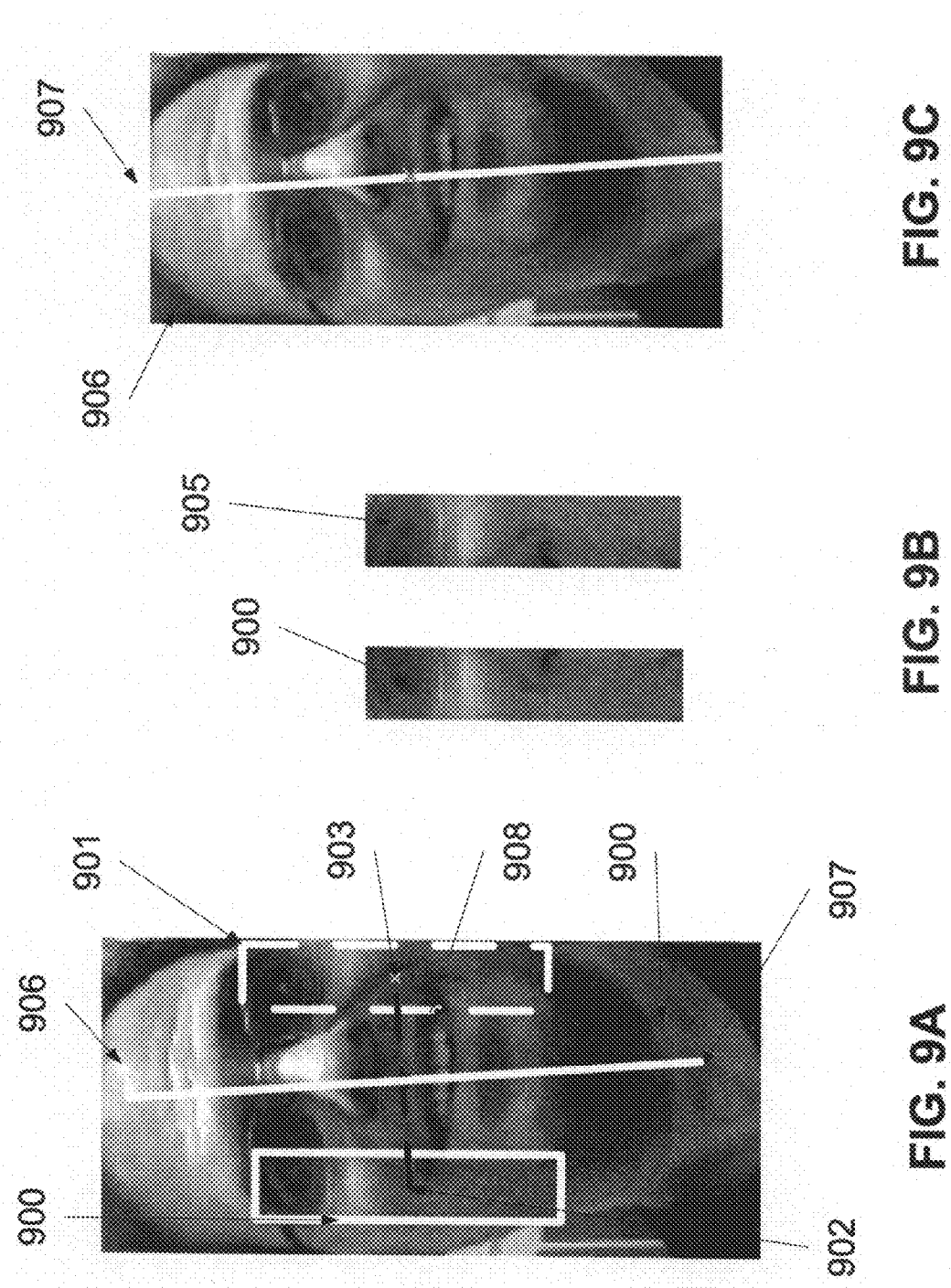
Figures 10A, 10B:
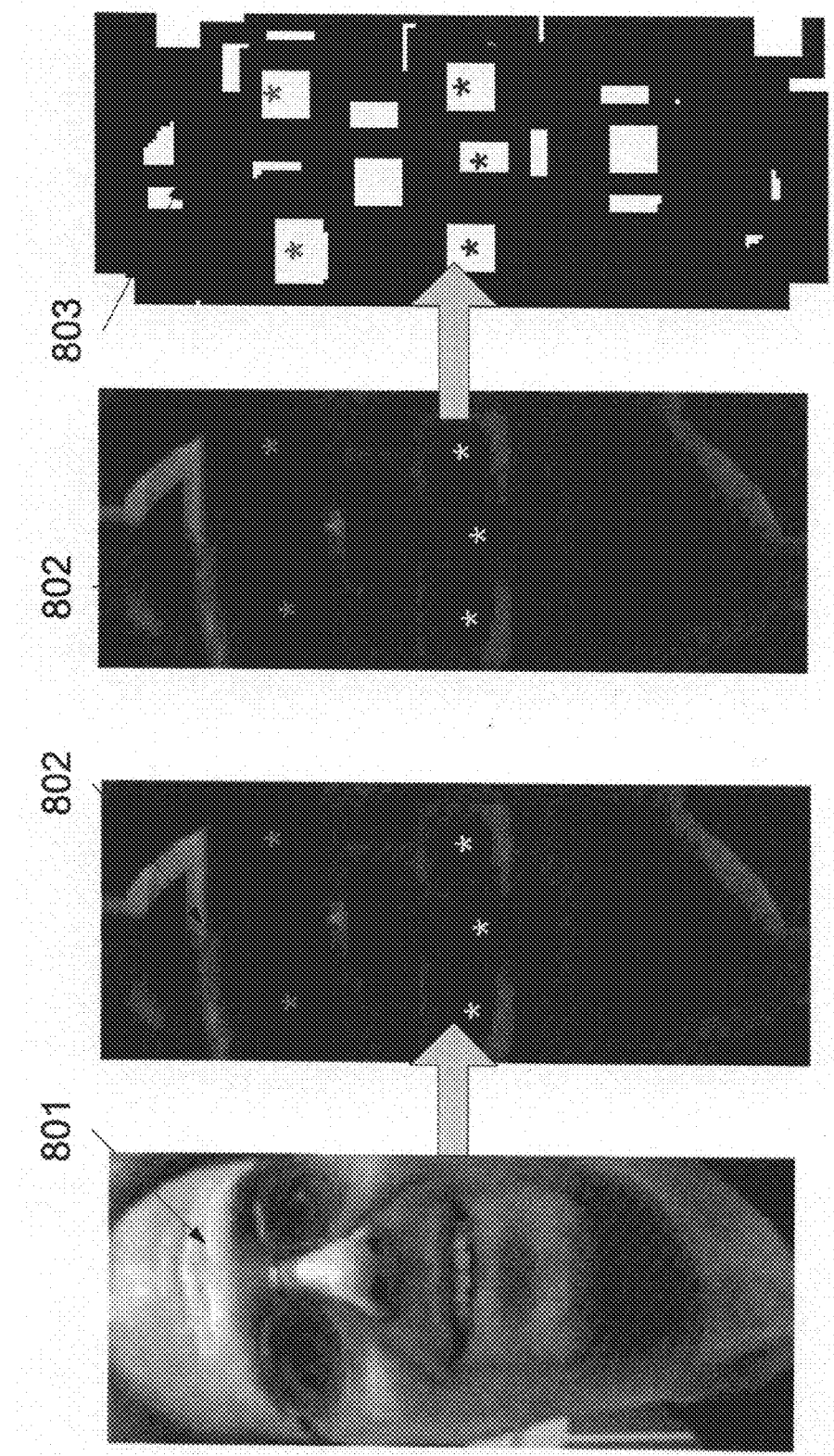
Figures 11A, 11B:
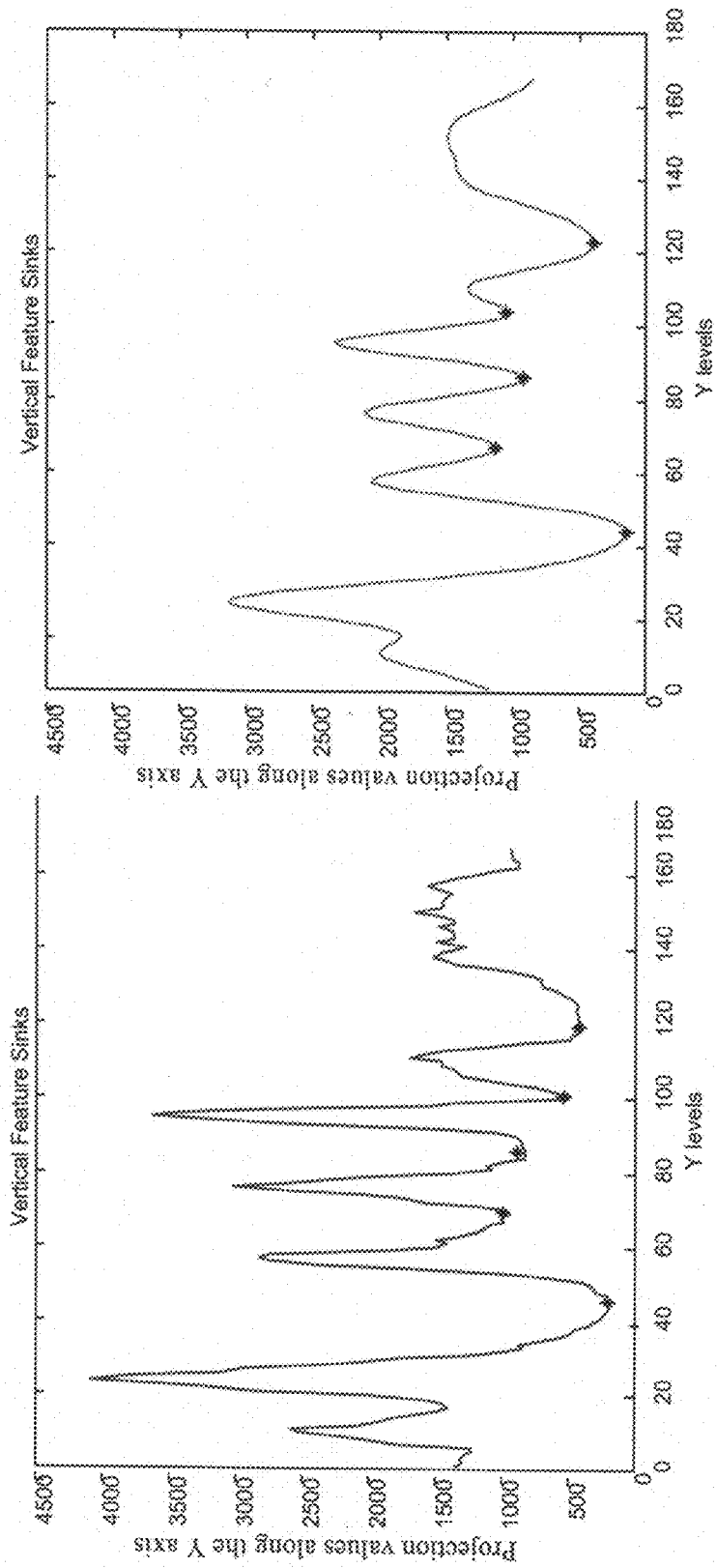

FIG. 1 is a simplified flowchart diagram of a method for facial feature detection, according to a preferred embodiment of the present invention;

FIG. 2A is a digital image picked up by an image sensor which is used as a digital image input;

FIG. 2B is a processed image of the digital image of FIG. 2A, based on the hue level of the digital image of FIG. 2A after it has been inverted and gamma corrected;

FIG. 2C is the digital image of FIG. 2A with a face segment that delimits the face of the depicted person;

FIG. 2D is the face segment image which delimits a face and two subimages which divide the face segment image into upper and lower subimages of the digital image;

FIG. 3A is a comparative graph that depicts a one-dimensional projection of the hue level values on the X axis;

FIG. 3B is a comparative graph that depicts a one-dimensional projection of the hue level values on the Y axis;

FIG. 4A is a comparative graph that depicts a one-dimensional projection of the hue level values on the X axis which has been smoothed using a smoothing filter;

FIG. 4B is a comparative graph that depicts a one-dimensional projection of the hue level values on the Y axis which has been smoothed using a smoothing filter;

FIG. 5 is a simplified flowchart diagram of a process of identifying a centerline of a human face within the boundaries of a face segment, according to a preferred embodiment of the present invention;

FIGS. 6A, 6B and 6C are subimages at various steps of the centerline detection process, according to a preferred embodiment of the present invention;

FIG. 7A is a comparative graph that depicts the outcome of the calculation of the normalized correlation value of columns of pixels along the X axis, according to a preferred embodiment of the present invention;

FIG. 7B is an exemplary face segment which has been used to generate the graph which is depicted in FIG. 7A;

FIG. 8 is another simplified flowchart diagram of a process of identifying a centerline of a human face within the boundaries of a face segment, according to another embodiment of the present invention;

FIGS. 9A, 9B and 9C are sections of a digital image which respectively depict a gray level face segment with a template and a corresponding matching section, a template and a corresponding mirrored template, and a gray level face segment with an estimated centerline;

FIG. 10A is a gray level face segment of a digital image and a Gray Level Morphological Deep Map (GMDM) which has been created based thereupon, according to another embodiment of the present invention;

FIG. 10B is a GMDM and a Binary Level Morphological Deep Map (BMDM) which has been created based thereupon, according to another embodiment of the present invention;

FIG. 11A is a comparative graph that depicts a one-dimensional projection of the pixel values on the Y axis, according to a preferred embodiment of the present invention;

FIG. 11B is a comparative graph that depicts a smoothed version of the graph of FIG. 11A.

Figure 12:
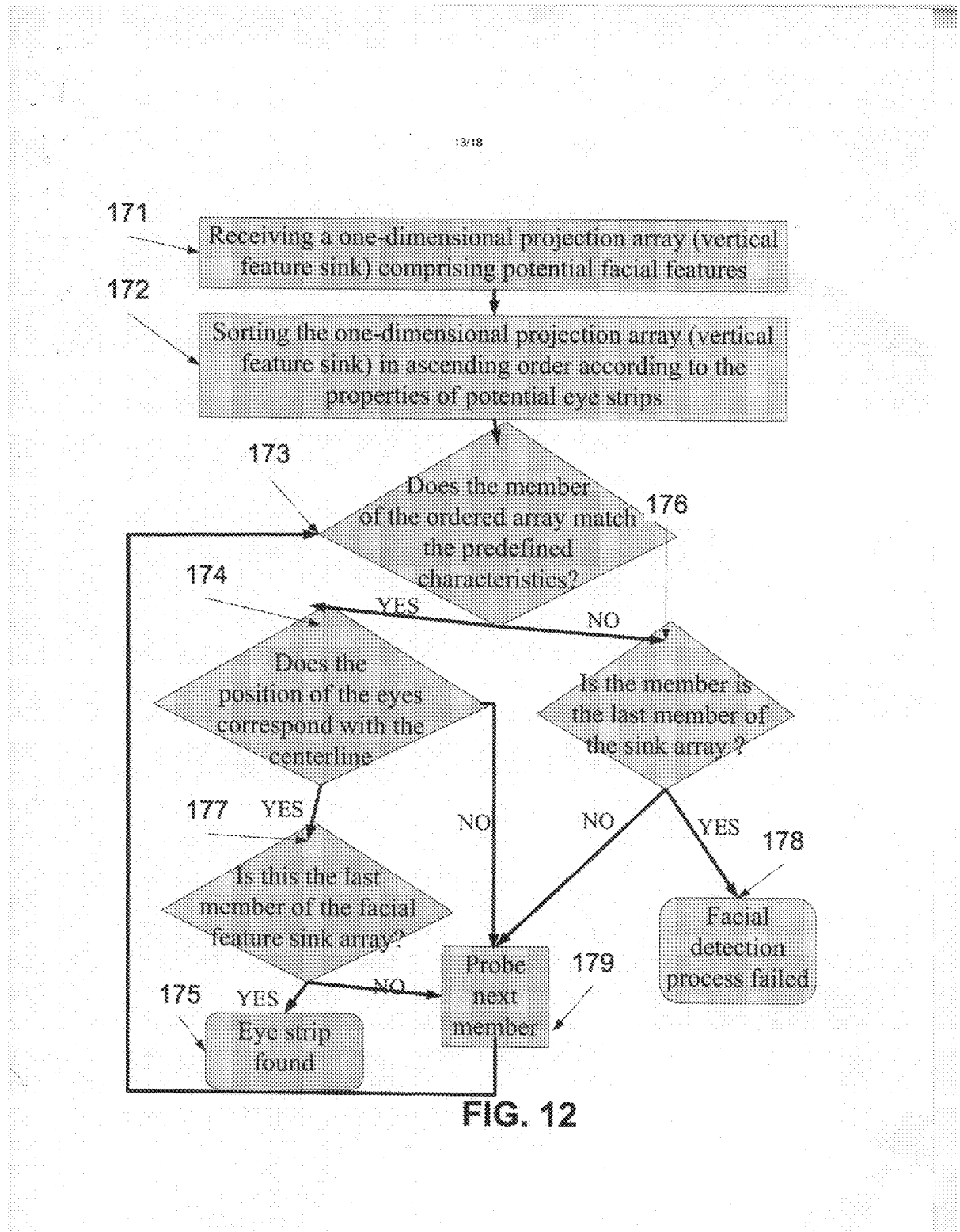
Figure 13:
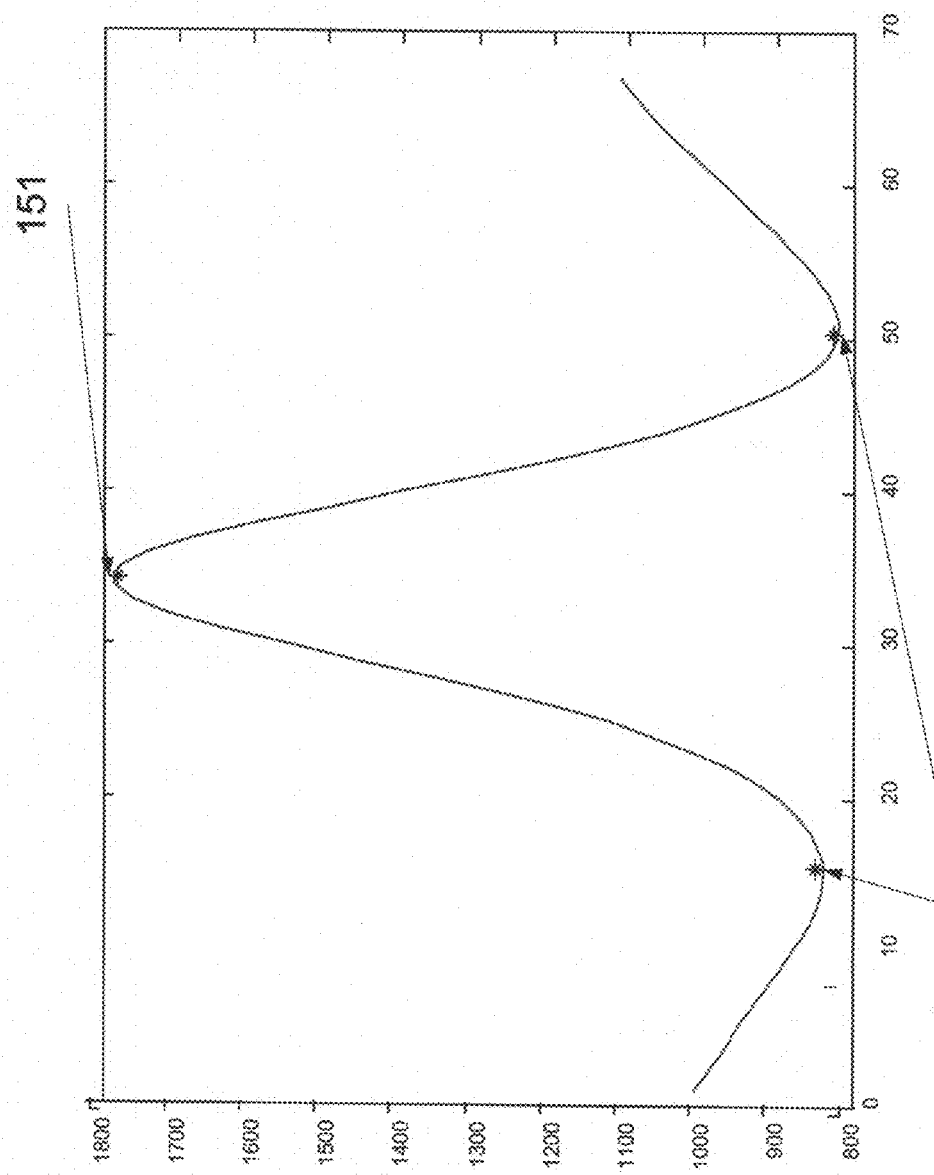
Figure 14:
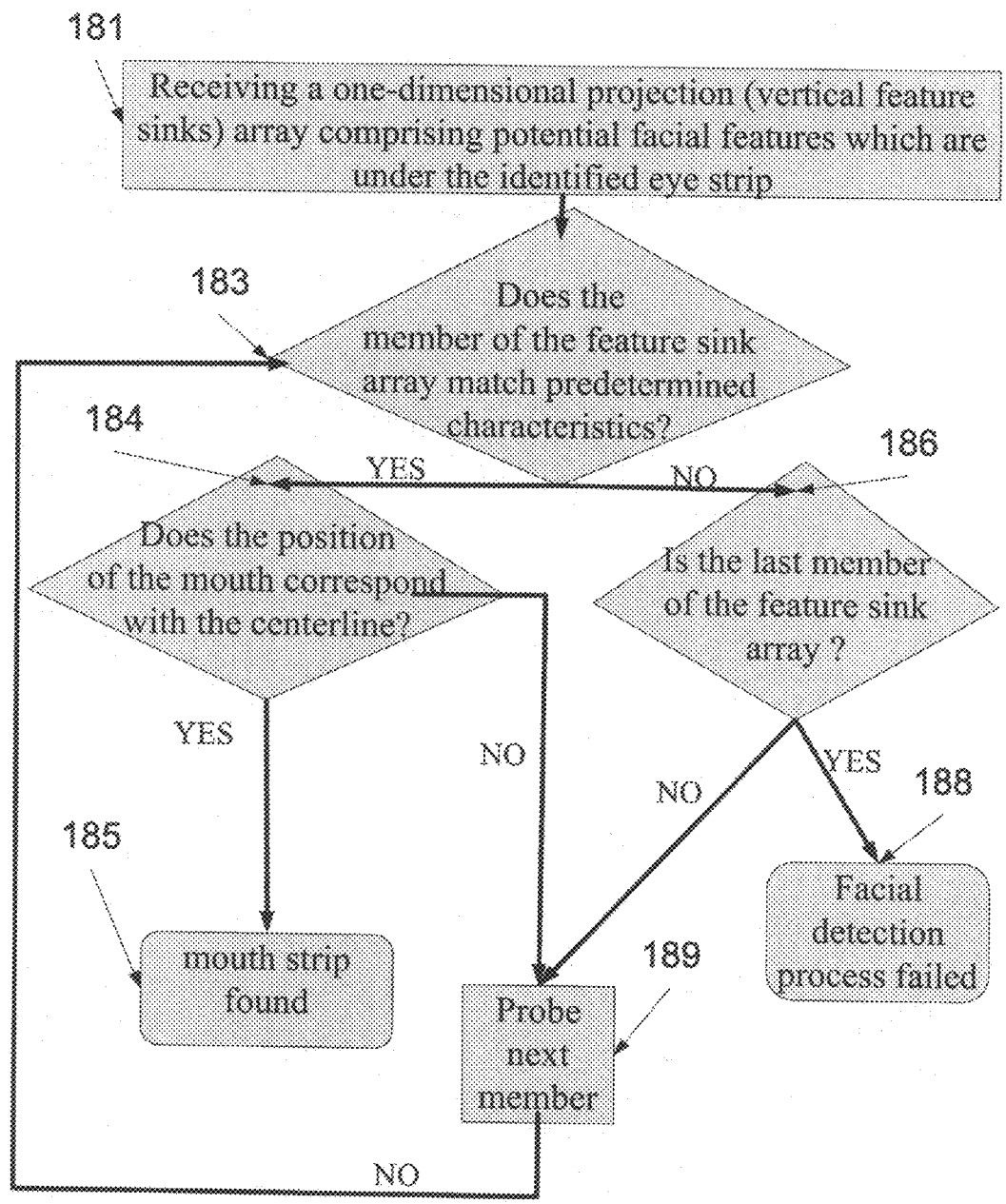
Figure 15:
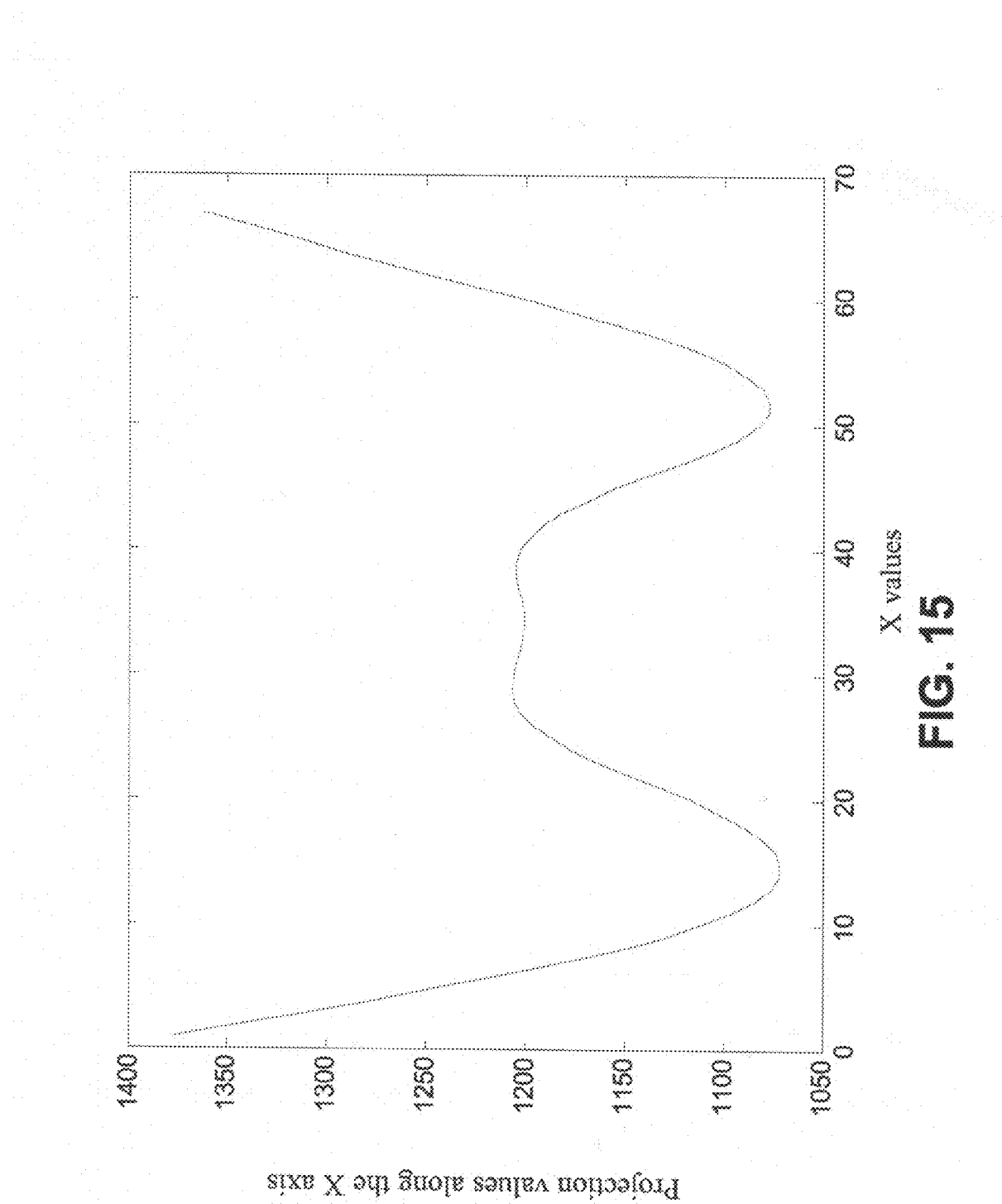
Figure 16:
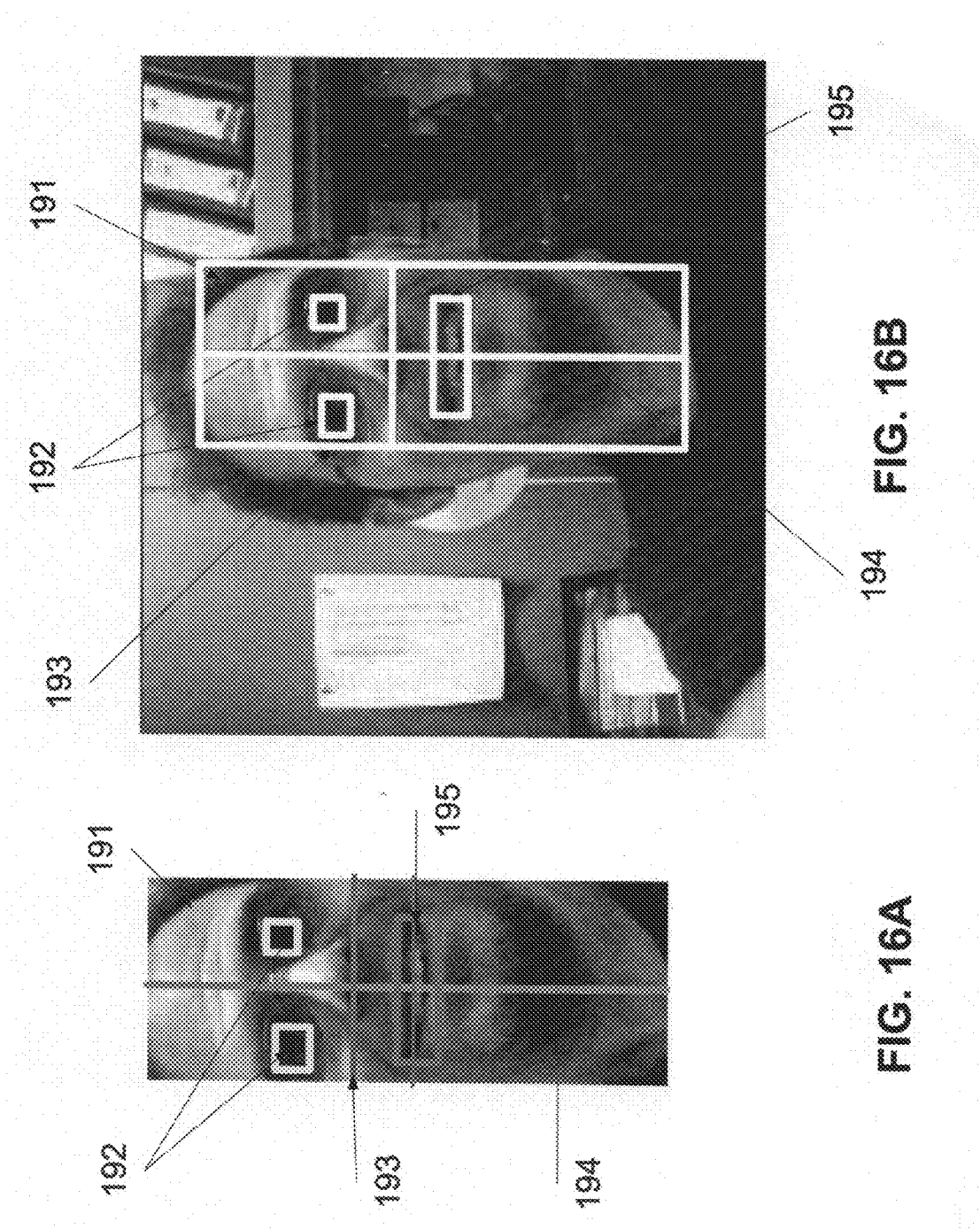
Figure 17:
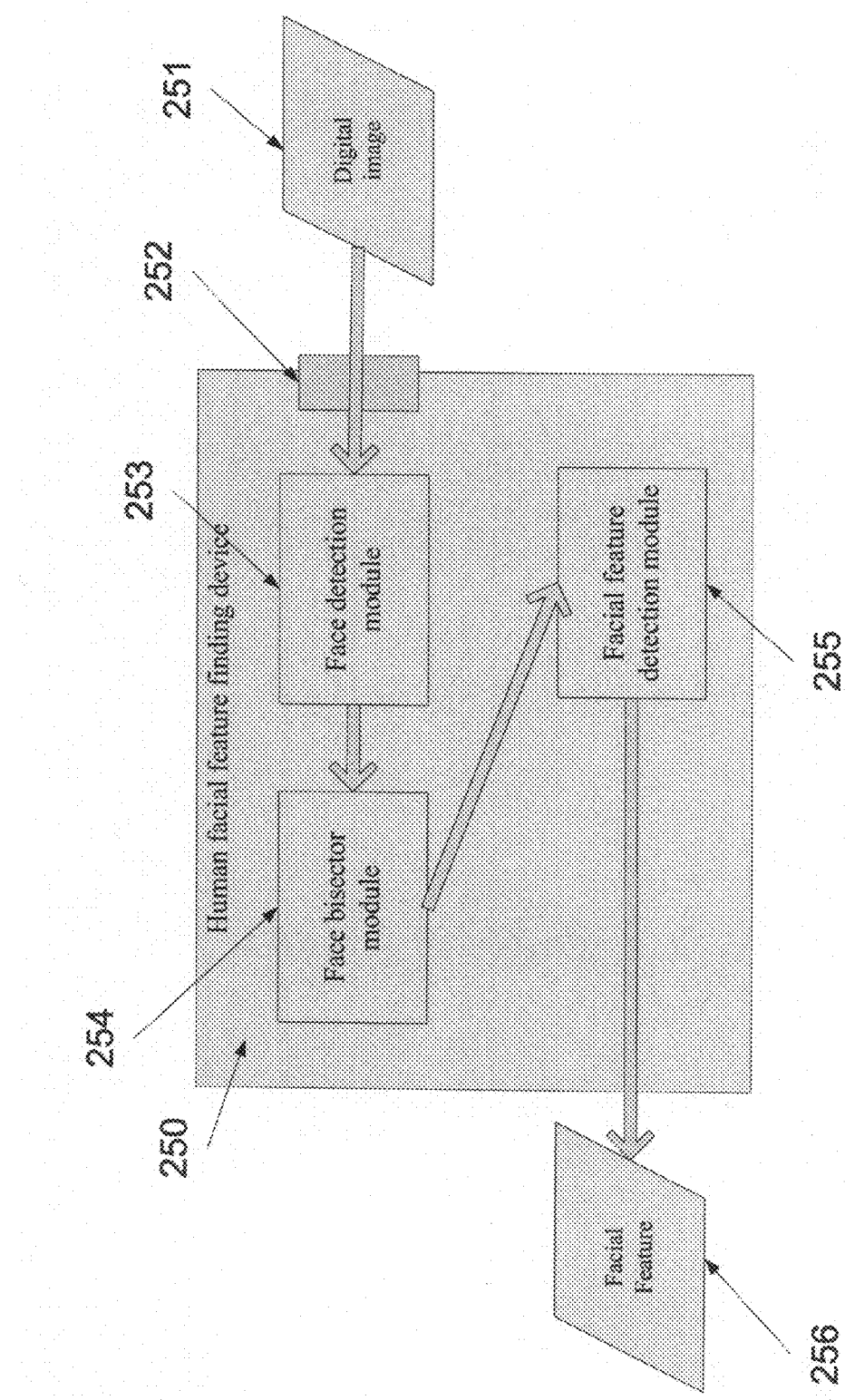

FIG. 12 is a simplified flowchart diagram of an eye strip detection process, according to a preferred embodiment of the present invention;

FIG. 13 is a descriptive graph that depicts a typical outcome of a one-dimensional projection on the X axis of a typical eye strip, according to a preferred embodiment of the present invention;

FIG. 14 is a simplified flowchart diagram of a mouth strip detection process, according to a preferred embodiment of the present invention;

FIG. 15 is a descriptive graph that depicts a typical outcome of a one-dimensional projection on the X axis of a typical mouth strip, according to a preferred embodiment of the present invention;

FIG. 16A is a gray level face segment in which parts of the image that comprise the facial features of the depicted face are segmented, according to a preferred embodiment of the present invention;

FIG. 16B is an exemplary digital image that depicts part of the image that comprise a human face in which the face and the facial features are segmented; and FIG. 17 is a schematic illustration of a device for generating human facial feature segments based on a digital image input, according to a preferred embodiment of present invention.

DESCRIPTION OF THE PREFERRED EMBODIMENTS

The present embodiments comprise a device and a method for segmenting an image in order to identify the face and facial features and, more particularly but not exclusively, to a device and a method for segmenting an image of a face for detection of face and facial features using a vertical centerline, the method having linear computational complexity.

The principles and operation of a device and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

One embodiment of the present invention is a method for facial feature detection. The method comprises several steps. During the first step a digital image comprising a face is received. The digital image comprises a plurality of color pixels, each pixel comprising color information. After the digital image has been received the boundaries of the face have to be detected. Then, during the following step, the part of the image that has the face is segmented, based upon the color information of pixels of the digital image. The face segment comprises an outline of the face. After the boundaries of the face have been determined, and in order to identify a reference that may be used to detect the facial features of the face, a centerline is applied to the face based on the symmetrical properties of the face. Then, using the centerline as a reference, the facial features within the boundaries of the face segment are detected. This method enables a relatively fast identification of facial features from a digital image of a human face.

In another embodiment of the present invention there is provided a human facial feature detection device. The device comprises an image input device having a connection to an image sensor. The image input device receives a two-dimensional digital image containing a human face from the image sensor. The received digital image is used as the basis and the reference for image processing which is done by other modules of the human facial feature detection device. The device further comprises a face detection module that detects a face segment within the boundaries of the digital image. The face segment delimits a human face. A face bisector module is used to identify a centerline that bisects the delimited face. Another module that comprises the device is a facial feature detection module. The facial feature detection module detects facial feature segments which are delimited within the boundaries of the face segment. The device uses a facial feature output device to output a number of subimages. Each subimage is generated according to a respective facial feature segment.

Reference is now made to FIG. 1, which is a flowchart that illustrates a method for facial feature detection, according to one preferred embodiment of the present invention. FIG. 1 depicts a four-step process. During the first step, 101, the computing unit receives a digital image that depicts a human face. Such a digital image comprises a plurality of color pixels, each pixel comprising color information. During step 102, the face which is featured in the digital image is identified and a candidate face region that comprises the part of the image that has the face is segmented based on color information which is represented by the color pixels. The color information represents, inter alia, the skin color of the face which is depicted in the image. As elaborated below, the dynamic range of the skin color is quite narrow, thus enabling the differentiation of the face from other objects in the scene. The face segment comprises an outline of the human face. In the subsequent step, at 103, a centerline within the boundaries of the outline of the face is identified. The centerline bisects the human face into two approximately symmetric half-face sides. During the following step, as shown at 104, the centerline is used as a reference to locate facial features which are present within the boundaries of the face segment.

A more detailed description of the method for facial feature detection according to a preferred embodiment of the present invention is as follows: During the first step, 101, the computing unit receives a digital image that depicts a human face. The digital image comprises a plurality of color pixels, each pixel comprising color information. Each pixel holds data bits that represent local brightness and color within the digital image, and the particular image may use any one of a number of different types of color coordinates.

The image sensor which is used to capture such images typically outputs a digital image in Red-Blue-Green (RGB) color coordinates or other color space coordinates. The RGB color coordinates of each pixel can disclose important information about the objects which are depicted in the digital image. However, in the preferred embodiment of the present invention other color coordinates schemes may be used.

Therefore, preferably, the method comprises a step of converting the RGB color coordinates of the digital image to Hue-Saturation-Value (HSV) color coordinates.

The image sensor which is used to capture such images may output a digital image in a variety of color coordinates. The method may preferably comprise a step of converting the color space coordinates of the digital image to HSV color coordinates.

The HSV color coordinates, defines a color space in terms of three constituent components. The Hue component defines the color type between the values of 0 and 360. The values may be normalized between 0 and 1. The Saturation component defines the purity of the related hue component of the color between 0 and 1, thus representing the purity of the color. The lower the saturation level of a certain pixel, the grayer is the color type. The Value component defines the intensity of the brightness of the color between 0 and 1. Each one of the values, which may be represented in the range between 0 and 1, is correlated with the aforementioned values.

Preferably, the color coordinates are converted using the following set of equations:

$$H = \arccos \frac{\frac{1}{2}((R-G)+(R-B))}{\sqrt{(R-G)^2 + (R-B)(G-B)}} \quad (1)$$

$$S = 1 - 3\frac{\min(R, G, B)}{R+G+B} \quad (2)$$

$$V = 0.299R + 0.587G + 0.114B \quad (3)$$

It should be noted that if B<G then H=360°−H.

FIG. 2A is a digital image picked up by an image sensor, as described below, which is received during step 101 of FIG. 1. This digital image is used in a method for facial feature detection in accordance with the present invention.

Preferably, after converting the digital image to HSV color space, the digital image is filtered to remove noise, for example salt and pepper noise Preferably, the salt and pepper noise is reduced using filters, for example n*m order filters. Minimum filters, Maximum filters or Median filters may be used to reduce the salt and pepper noise. Using a median filter for reducing the salt and paper noise, for example, may require significant amount of computational resources. Using a number of minimal or maximal order filters for the same purpose requires a more limited amount of computational resources. Therefore preferably, an erosion-dilation process is performed using two different order filters in order to reduce the noise. Initially, a first order filter, which is a minimum filter, is used for eroding objects on the digital image. Then a second order filter, which is a maximum filter, is used for dilating objects on the digital image. This two step process achieves an effect of removing salt and pepper noise. Moreover, the process is computationally cheaper and achieves the effect of removing salt noise which is in fact the noise dominantly affecting the image quality of the hue image (dark parts are sought). Reducing the salt and pepper noise substantially improves the processing of the gray level digital image, which is generated during the following steps.

As shown at FIG. 1, during step 102 the boundaries of the candidate face region are identified and the part of the image that comprises the human face is segmented. Such segmentation reduces the number of pixels which have to be analyzed in order to identify the requested facial features. Preferably, in order to support the segmentation of the face area, the contrast between the face area and the rest of the image is sharpened.

The HSV color space may be very helpful for identifying the area of the digital image where the face is found. The hue segmentation of a face segment is based on color information of the color pixels.

It has become apparent from statistical analysis of large data sets that the hue distribution of human skin is in a certain range. This characteristic is reflected as the common hue level of most of the color pixels which represent human skin. Additionally or alternatively the common hue level may be used to detect a cluster of color pixels which represent the skin of the face of the digitally-imaged person in the digital image.

It should be noted that people of all races have skin color with approximately the same dominant frequency in the color spectrum. This frequency is reflected in a common hue level, but with different saturation spread. The variance between different hue levels is small and can be detected. Preferably, the saturation level of each pixel may be used in addition to the hue level in order to augment the determination of whether the pixel represents human skin or not.

In another embodiment of the present invention the RGB color space is converted to YCbCr color space. The YCbCr color space can also be used to identify pixels which are estimated as representing human skin based on the Cb and Cr components of skin.

In order to intensify the contrast between the pixels that might represent the face area and the pixels that represent the rest of the digital image, the gray levels of the digital image are inverted and are contrast corrected. This procedure intensifies the contrast between the pixels that represent human skin and pixels that represent the rest of the digital image. Now, the gray levels of pixels representing skin are relatively bright (high).

FIG. 2B, for example, is a processed result of the digital image of FIG. 2A. The processed image is based on the hue level of the digital image after it has been inverted and its contrast has been corrected, for example by using gamma correction.

It is known that the hue level of human skin is relatively dark. Hence, after the aforementioned inversion it is relatively bright. Hence, emphasizing the contrast between bright pixels to dark pixels may assist the face detection process. Preferably, the contrast between dark pixels and bright pixels is strengthened by a contrast correction process. In one preferred embodiment the hue level of each color pixel of the digital image is gamma corrected using the nonlinear power function: (new normalized hue value)=(old normalized hue value)$^{gamma}$. Preferably, the value of gamma is 4, This correction is extremely effective when gamma is greater than 1 because after the gray level inversion the value of the face pixels get closer to the maximum. The high values of the face pixels can be used for choosing such a contrast correction scheme. Since the digital image has been gamma corrected and the contrast between the bright pixels and the dark pixels has been strengthened, it is easier to differentiate between the face area and the rest of the image. As described above, the received digital image is a bitmapped image. Hence, one can divide the image into rows and columns of pixels. In one preferred embodiment of the present invention, the rows and the columns are used to create a one-dimensional projection profile. The complexity of analyzing this profile is substantially less than the computational complexity of two-dimensional analysis. Such a profile can be analyzed in linear computational time and will, therefore, substantially reduce the computational complexity of two dimensional analysis.

Reference is now made to FIG. 3A and FIG. 3B which depict comparative graphs. The graphs depict a one-dimensional projection of the hue level values on the X axis and on the Y axis, respectively. As described above, the hue level value of pixels that represent the face area is estimated to be in a predefined skin hue range. Hence, the mean value of pixels in each digital image column or row that comprises face area pixels is usually closer to the skin hue range than any other column or row.

By processing the one-dimensional projection on the X axis of each column of the digital image, the method reveals the columns which have a high number of face hue pixels that represent, inter alia, skin color. As described above, since the hue level of face pixels is higher than the hue level of other pixels, the sum of rows that comprise face pixels is higher. In the same manner, by separately processing a one-dimensional projection on the Y axis of each one of the rows, the method reveals the rows with a high number of face area pixels. Since human faces are usually long relative to their width, projecting on the X axis, that is to say, a summation of the value of pixels in each column produces more facial data than projecting on the Y axis. Hence, preferably, the projection on the X axis is done first.

Preferably, during the one-dimensional projection, the hue level of pixels of each column of pixels is summed separately. Since the brightness level of the facial skin is relativity high, the sum of each column which comprises pixels that represent a human face is respectively high.

In another embodiment, a threshold filter is configured to define whether a certain pixel is a face area pixel or not. Preferably, the threshold filter is shifted to separately scan each column and to count how many pixels are face pixels. A cluster of columns with a high number of face pixels is clearly apparent as a candidate face interval.

FIG. 3A depicts the outcome of a one-dimensional projection on the X axis based on a digital image which has been pixelated to comprise 240 columns and 214 rows of pixels, as shown at 201. As depicted, the values of pixels of the columns with X coordinates between 70 and 170 have been summed up and have been determined to represent the horizontal placement of the face area in the digital image. In this example a sum greater than 70 implies that the columns represent the face area in the digital image. Individual thresholds for the domain to the right of the peak in the x projection and the right of the maximum have been dynamically determined. The thresholds are determined by being the first inflection or local-minimum point in each direction below a given percentage of the maximal value of the projection curve. In this case both thresholds are above 70 and are marked with an X in FIG. 3A. Such a dynamic threshold-finding process promises efficient segmentation under varying illumination and observation conditions. Using the individual left and right dynamic thresholds the left and right boundaries 205, 206 of the face segment are determined.

Then, in order to determine the upper and lower boundaries of the face segment, each row is projected to generate a one-dimensional projection on the Y axis in a similar manner, as described above. However, since the left and right boundaries of the face segment are already known, there is no reason to reassess some of the image areas which already have been identified as unrelated to the candidate face region. Hence, only the digital image area between the left boundary 205 and the right boundary 206 is projected to create a one-dimensional projection on the Y axis. FIG. 3B depicts the outcome of a one-dimensional projection on the Y axis based on the same digital image as above, as shown at 202.

In general, the one-dimensional projection on the Y axis resembles the one-dimensional projection on the X axis. However, there are a few differences. For example, since faces are longer than they are wide, fewer face pixels are estimated to be in each row that comprises pixels from the face area. In addition, as described above, pixels have been cut out from both sides of the rows during the one-dimensional projection on the X axis. Therefore, each analyzed row has fewer pixels than the rows of the original image. Using the same methodology as in the X projection above the upper and lower boundaries 207, 208 of the face segment are determined.

Reference is now made to FIG. 2C which is an exemplary digital image 300 which has been used to identify a face segment 301. The rectangle reflects the boundaries of face segment 301 which have been identified as described above. The one-dimensional projection of each one of the columns has produced the left and right boundaries 310. The one-dimensional projection of each of the rows has produced the upper and lower boundaries 311.

Reference is now made to FIGS. 4A and 4B which depict comparative graphs. Each of the graphs depicts the outcome of the same one-dimensional projections of the hue level values on the X axis and on the Y axis as in FIGS. 3A and 3B, respectively. However, in FIGS. 4A and 4B the outcomes of the one-dimensional projection have been smoothed using a Total Variation (TV) smoothing process. It is these smoothed graphs 4A and 4B which are used in determining the left and right thresholds and boundaries for the x and y projections. The method of determining these thresholds have been described above in relation to FIGS. 3A and 3B.

The one-dimensional projection may generate an irregular graph that might reduce the accuracy of the boundary identification. Hence, the outcome of the one-dimensional projection process on both the X axis and the Y axis may be smoothed, preferably, by a TV smoothing process. The TV smoothing process is achieved by minimizing the following expression with respect to each of the $z_i$:

$$\sum_{i=1}^{n}\left((u_i - z_i)^2 + \lambda(D^k z_i)^2\right)$$

where $u_i$, i=1, 2, ..., n denotes the values of the original one-dimensional projection, $z_i$, i=1, 2, ..., n denotes the determined smoothed curve values, and λ denotes the balance between smoothing and interpolation. D denotes a one dimensional derivative operator and k is the number of derivatives taken. The algorithm outputs a set of smoothed values, $z_i$. Preferably, the value of k is 2 so that λ is essentially balancing out minimal curvature with interpolation. In addition, the higher the value of λ, the smoother the curvature will be in the resulting set of z. Preferably, the value of λ is 500. The computational complexity of calculating the total variation smoothing process for the z set with k=2 is on the order of O(n). As depicted in FIGS. 4A and 4B, the output z set plots a smoothed graph that highlights the tendency of the graph and facilitates a better processing of the projection curves. In another embodiment of the present invention, the face segment is identified by applying a predefined function to each pixel of the digital image. Such a function may be comprised of a statistical, a static, a dynamic or any other condition regarding the hue level of each pixel. Such a function may be used to perform a connected component analysis that identifies clusters of pixels that correspond with the functions. The biggest elliptic cluster is segmented as the estimated face area. Such a process is an example of an image binarization process. Though an image binarization process may identify more accurately the candidate face region, the computational complexity of the image binarization process is higher than the computational complexity of the projection process which has been described above.

Reference is now made once again, to FIG. 1. After step 102 has been completed and a face segment has been found, the next step, 103, may be performed. During step 103, a centerline that bisects the human face which is delimited within the boundaries of the face segment is identified.

As clearly known, human faces are generally symmetric. The left side of a human face is approximately a mirror image of the right side of the same face. If a vertical line of symmetry is drawn through the center of the face, the left side of the face is almost identical to the right side. The fact that human faces are symmetric can be used in order to identify a centerline, and the centerline can then be used as a reference to identify the exact location of facial features within the boundaries of the face segment.

Reference is now made to FIG. 5, which is a flowchart that illustrates a process of identifying a centerline of a human face within the boundaries of a face segment, according to a preferred embodiment of the present invention. As described above, during the previous steps, a face segment has been identified. During this process the face segment is searched to determine a centerline that bisects the face into two approximately symmetric sides.

Preferably, the first step in finding a centerline, as shown at 401, is receiving a face segment and then, at step 402, generating a gray level image based upon the face segment. Preferably, the gray level image is generated using standard coefficients on the red, green, and blue color layers of the original face segment in order to generate a gray level face segment based on the original face segment. Since the gray level of each pixel of the face segment can be represented using one byte (0-255), the computational complexity of analyzing such a segment is lower than that of analyzing segments which are represented in RGB, HSV, CIELAB, or YCbCr color coordinates. In the subsequent step, as shown at 403, the gray level face segment is divided into several, preferably two, subimages.

The human face comprises facial features which can be bisected into two symmetric parts. The eye, for example, can be bisected. Teeth or noses may also be bisected into two approximately symmetric sides. Hence, in order to reduce the influence of symmetric facial features on column of pixels of the face segment, the face segment is divided into different subimages. Each one of the subimages potentially comprises different facial features. The division into subimages, as will be described below, enables gauging the difference between the symmetry levels of different segments along the probed column of pixels. By separately analyzing each subimage, the robustness of the centerline identification process increases.

In one embodiment of the present invention, the gray level face segment may be bisected into one subimage that comprises the upper half of the gray level face segment and another subimage that comprises the lower half of the gray level face segment.

Reference is now made to FIGS. 2C and 2D which depict a digital image 300 with a face segment 301, an exemplary gray level face segment 303 and related subimages 302, 304. The gray level face segment 303 has been generated according to the face segment 301 of the digital image 300. As shown, the gray level face segment 303 has been bisected into an upper subimage 304 and a lower subimage 302.

Reference is now made, once again, to FIG. 5. After the face segment has been divided into subimages, each subimage is analyzed. The analysis, as shown at step 404, is used to estimate the probability of each possible vertical line in each subimage being part of an X axis vertical symmetry centerline.

Reference in now made to FIGS. 6A, 6B and 6C which depict an exemplary subimage at various steps of the centerline detection process.

The first step of the centerline detection process is to define the boundaries of the region in which the vertical symmetry centerline is looked for. As described before, the analysis is based on a subimage of the gray level face segment. As described below, the process of identifying a vertical symmetry centerline is based on predefined regions from opposite sides of the probed potential vertical symmetry centerline. Accordingly, a sufficient space to contain the predefined regions has to be presented from both sides of the probed potential vertical symmetry centerline. Accordingly, columns which are positioned on the left and the right edges of gray level face segments cannot be probed as a potential vertical symmetry centerline since the predefined regions cannot be formed beyond the boundaries of the gray level face segment. Hence, columns from the left and right ends of the face segment are not probed as a potential vertical symmetry centerline.

In one embodiment each subimage is divided into two equal sections. As depicted in FIG. 6A, each section extends along the height of the subimage and along a certain percentage, preferably around 25 percent, of the width of the subimage. In such an embodiment the section 600 which is located in the proximity of the left edge of the face segment and the section 607 which is located in the proximity of the right edge of the face segment are not probed as a potential vertical symmetry centerline.

After the potential area for the presence of the centerline has been diminished, each remaining column of pixels within the face segment is probed as a potential centerline. As described above, the centerline is supposed to symmetrically bisect the face into two symmetric sides. Hence, sections from parallel positions of the face should comprise symmetric factors.

In order to identify a vertical symmetry centerline, a few steps are performed. First, a column of pixels 603 is chosen as a potential centerline. Then, a virtual window 601 is, preferably, defined in between the chosen column of pixels 603 and a line 604 which is located around one quarter of the subimage length in one direction from the chosen column of pixels 603. Another virtual window 602 is, preferably, defined in the opposite direction, in between the chosen column of pixels 603 and a line 605 which is located around one quarter of the subimage length in the other direction.

After the virtual windows 601 and 602 have been defined, as depicted in FIG. 6B, the pixels which are bounded by the virtual windows are compared. In order to compare the virtual windows, the rows of pixels of one of the virtual windows are horizontally mirrored. Preferably, as depicted in FIG. 6C, the rows of pixels of the right virtual window 602 are horizontally mirrored to produce virtual window 606. The horizontally mirrored rows of virtual window 606 are compared with corresponding rows of the other virtual window 601.

In a preferred embodiment, a normalized correlation value between the horizontally mirrored rows and the rows of the other virtual window is calculated. The normalized correlation value reflects the level of symmetry between the two virtual windows. The normalized correlation value may lie between −1 and 1. If negative correlation values are set to zero, then this level can reflect the likelihood that the chosen column of pixels 603 is the vertical symmetric centerline. The calculation of a normalized correlation value is generally well known and therefore is not described here in greater detail.

Each column within the boundaries of the face segments which is not one of the columns from the left and right ends of the face segment which are not being probed as a potential vertical symmetry centerline is analyzed according to the above described centerline detection process.

Reference in now made to FIG. 7A which depicts a comparative graph. The graph depicts the outcome of the calculation of the normalized correlation value of columns of pixels along the X axis of the face segment as described above.

The X axis of the graph denotes the X position of the analyzed column of pixels. The Y axis of the graph denotes the outcome of the calculation of the normalized correlation value, that is to say, the probability that the related column of pixels will be a vertical symmetry centerline. FIG. 7B is an exemplary face segment which has been used to generate the graph which is depicted in FIG. 7A.

As described above, the face segment is divided into subimages. FIG. 7A depicts the analysis of different columns of pixels in a face segment which has been divided into an upper subimage and a lower subimage. Curve 501 denotes the normalized correlation value of different columns of pixels in the upper subimage. Curve 503 denotes the normalized correlation value of different columns of pixels in the lower subimage.

As described above, the normalized correlation value reflects the probability of each column of pixels to be the vertical symmetry centerline of a certain image. Hence, the normalized correlation values of corresponding columns of pixels of different subimages of the same gray level face segment should be analyzed together.

In one embodiment, as shown in FIG. 7A, the normalized correlation values at respective columns of pixels (x values) are used to generate a curve of normalized correlation values which spans along the length of the gray level face segment. Curve 502, for example, denotes a function of the normalized correlation values of the upper subimage and the lower subimage. Preferably, the function represents an intersection of the normalized correlation values.

The advantage of dividing the face segment into subimages is that different facial features are analyzed separately. Such an embodiment facilitates comparing different segments of the analyzed column of pixels. For example, one can note, as shown at line 506, that, at around X=27, curve 501 has a high normalized correlation value. However, at around X=27, the high value does not correspond with curve 503 that represents the lower subimage. The peak represents a high normalized correlation value of a column of pixels that bisects the left eye of a person whose face is within the face segment, as shown at numeral 504 of FIG. 7B.

Unlike the curvatures of the subimage curves 501, 503 at around X=27, at around X=48 the subimage curves 501, 503 are correlated, as shown at line 508. The difference is even clearer when probing the combined curve 502. The combined normalized correlation value curve 502 represents the joint probability of the centerline to be the vertical symmetry centerline. The joint probably moderates the deviation between the different subimages, as described above. As shown at line 508, only correlated curvatures are reflected in the combined normalized correlation value curve 502.

The existence of such a combined normalized correlation value curve 502 implies that a virtual vertical symmetry centerline passes through the coordinates of the curvature peak. Such a vertical symmetry centerline approximately bisects the nose and the mouth, and divides the space between the eyes approximately in half. The positioning of the centerline in relation to the facial features may be used, during the subsequent step, in finding the facial features. Based upon the combined normalized correlation value, a vertical symmetry centerline is chosen, as depicted at numeral 508 of FIG. 7B. The identified vertical symmetry centerline is output, as shown at step 405 in FIG. 5.

Reference is now made to FIG. 8, which is a flowchart that illustrates another process for identifying a centerline of a human face within the boundaries of a face segment, according to another preferred embodiment of the present invention. As shown, the first two steps 401 of receiving a face segment and step 402 of generating a gray level face segment based on the original face segment are identical to the first steps of the process which is depicted in FIG. 5. However, the present embodiment further comprises steps 700 to 703 that depict a process of identifying a general symmetric symmetry axis using templates. As mentioned above, a left side of a human face is approximately symmetric to a mirror image of the right side of the same face. A template is used at some stage in the process, as described below, as a reference to horizontally mirrored template.

During step 700, a template is chosen on one side of the gray level face segment. The template is used to generate a parallel horizontally mirrored template which is matched with a section of the other side of the face. However, no previous knowledge of the gray level face segment is known. Moreover, the face may be positioned at a different angle. Clearly, the angle of the face has an influence on the position of the symmetry line that bisects the face which is delimited in the gray level face segment. Thus, if the chosen template comprises only a limited section, the parallel horizontally mirrored template may not be matched. However, if the chosen template encircles a relatively large section, the computational complexity of the matching process is respectively increased and the matching accuracy is diminished. Moreover, the template has to be shorter than the height of the gray level face segment to allow for potential rotation of the face and narrower than the width of one side of the gray level face segment. Hence, in order to successfully match a parallel horizontally mirrored template, as described above, a template which is adapted to the above mentioned limitations is preferably chosen as an original template.

Preferably, a template which is almost as long as the gray level face segment, and is about one third as wide as the image is chosen. The difference between the length of the template and the height of the original image determines the amount which can be searched above and below and determines the maximum rotation that one can allow in the algorithm i.e the extent of the rotation that you can calculate is dictated by the size (length and height) of the template. Preferably, the template is taken from the left side of the gray level face segment. The template is stretched from the tenth column of pixels from the left end of the gray level segment to a vertical line one third of the gray level face segment's width from the left end. Preferably, not all the rows are covered by the template. The coverage of rows of pixels is inferred from the size of the gray level face segment. Preferably, the width of the upper and lower margins of the gray level face segment which are not covered by the template is a derivative of the gray level face segment length. In one preferred embodiment, the template covers only rows of pixels from the 40$^{th}$ row of pixels from the top to the 50$^{th}$ row of pixels from the bottom. During step 701, a horizontally mirrored template is generated. Then, in step 702, the horizontally mirrored template is compared with different respectively shaped sections of the gray level face segment in order to find a matching section. Preferably, a normalized correlation value between the horizontally mirrored rows of the original template and the rows of the compared section is calculated. The calculated value may be interpreted as the level of symmetry between the two sections. The normalized correlation value is between −1 and 1. Clearly, this level reflects the likelihood that the compared section is symmetric to the original template.

Based upon the calculation of the normalized correlation values, a section which is symmetric to the original template is chosen as a mirrored template. Additionally, one may choose to use several templates whose joint normalized correlation maps may more accurately identify the symmetric match.

Both the original template and the horizontally mirrored template comprise center points that represent the centers of the templates. These center points are used to identify a general symmetric axis that approximately bisects the face which is bounded within the face segment.

A general symmetry axis is plotted as a perpendicular bisector of the line between the two center points. In step 703, based upon the general symmetry axis, an estimated centerline is outputted.

Reference is now made to FIGS. 9A, 9B and 9C which respectively depict a gray level face segment 906 with a template 900 and a corresponding matching section 901, a template 900 and a related corresponding horizontally mirrored template 905, and a gray level face segment 906 with an estimated centerline 907. As shown at FIG. 9A, after the matching section 901 has been identified, the two center points 902, 903 are used to define a line 908. An identified general symmetric symmetry axis 907 is defined as the perpendicular bisector of line 908 which is plotted in the middle of the line which is stretched between the two center points. As shown at FIG. 9C, the general symmetry axis 907 is used as a basis for an estimated centerline. As depicted, the estimated centerline is approximately parallel to the angle of the face which is delimited within the gray level face segment.

The vertical symmetry centerline, as described above, bisects the portion of the face which is delimited in the gray level face segment. Accordingly, the gray level face segment is divided by the vertical symmetry centerline into two side images. The side images may be unequal. Since each side image comprises one side of the bisected face, it is clear that the width of the narrower side is sufficient for either side of the bisected face. Hence, preferably, in order to reduce the computational complexity of the subsequent steps, the gray level face segment is slimmed down. During the slimming process, both sides of the gray level face segment are slimmed to have the same width, such that the width of each side is equal to the width of the narrower side of the bisected face. The output of the slimming process is a slimmer, gray level face segment that can be analyzed faster.

Reference is now made, once again, to FIG. 1, step 104, wherein it is shown that, after the centerline has been identified, it is used to segment facial features. The first step of the facial feature segmentation is to generate a Gray Level Morphological Deep Map (GMDM) and a Binary Morphological Deep Map (BMDM) based on the gray level face segment.

Reference is now made to FIGS. 10A and 10B which are versions of the same gray level face segment of a digital image. FIG. 10A exemplifies the conversion of the gray level face segment to a GMDM and FIG. 10B exemplifies the conversion of the gray level morphological deep map to a BMDM.

It is well known that when analyzing a gray level digital image that comprises a human face, the eyes and the mouth are darker and deeper than the skin face and other facial features. This characteristic is used to identify the exact position of both the eyes and the mouth in the gray level face segment. In order to highlight the eyes and the mouth, gray level morphology with a square structuring element is performed, resulting in morphological deep maps.

Preferably, morphological erosion is performed twice, each with square structuring elements of different sizes. In each eroded version, the eyes and mouth are emphasized relative to the light skin and other facial features. The first erosion uses a relatively small structuring element which is used to darken pixels according to their immediate surroundings. The second erosion uses a structuring element which is larger and which is used to darken pixels according to a wider area. The smaller structuring element is first used in order to generate a first temporary morphological map. Each pixel of the first temporary morphological map represents a corresponding pixel in the gray level face segment which has been changed according to the brightness of a set of pixels which has been positioned within the region defined by the smaller structuring element during the eroding. The larger structuring element is then used in order to generate a second temporary morphological map. Each pixel of the second temporary morphological map represents a corresponding pixel in the gray level face segment which has been changed according to the brightness of a set of pixels which has been positioned within the region defined by the larger structuring element during the eroding. After the two temporary morphological maps have been generated, the value of each pixel of the first temporary morphological map is decreased by the value of a corresponding pixel in the second temporary morphological map. The outcome of each decrement is stored in a corresponding pixel of the GMDM. As depicted in FIG. 10A, the eye and mouth pixels of the gray level face segment 801 are represented as large clusters of dark pixels in the output of GMDM 802. This two step process of eroding using two different erosion structuring elements can be described in the following algorithm:

$$_AH1=(2X+1)^2;$$

$$_AH2=(2Y+1)^2;$$

$$X<Y;$$

GMDM=erode(gray level face segment, $_AH1$)−erode(gray level face segment, $_AH2$)

where $_AH1$ and $_AH2$ respectively denote the areas of the larger and the smaller square structuring elements, X and Y respectively denote the half of the length of each of the square structuring element and erode denotes the generation of a temporary morphological map based on the gray level face segment using erosion with the given structuring element. Preferably X=5 and Y=10.

As described above, each one of the temporary morphological maps is based on the same picture. Accordingly, the value of the pixels that have the minimum values in the first temporary morphological map must be equal to the value of respective pixels in the second temporary morphological map. Moreover, as described above, each pixel of the GMDM 802 represents the difference between the corresponding pixels in the temporary morphological maps. Therefore, the value of the pixels in the GMDM that correspond to pixels in the temporary morphological map that have minimum values is equal to zero.

Since facial features such as the mouth, the nostrils, and the eyes tend to be the darkest and the deepest objects, regions that comprise a collection of pixels having zero value have a high probability of comprising such facial features.

Since pixels of the darkest and the deepest objects have the same value in the GMDM, the GMDM 802 can be easily binarized. The binarization process can be described in the following algorithm:

BMDM=(GMDM==0)

The BMDM generation process, shown in FIG. 10B, transforms the GMDM 802 to a BMDM 803. The BMDM 803 comprises only emphasized clusters of pixels that indicate the position of the darkest and the deepest clusters of pixels of the Gray Level Face Segment.

Now, after the BMDM and GMDM generation processes have been completed and the vertical symmetry centerline has been identified, the eyes and the mouth may be detected.

In one embodiment of the present invention several pairs of GMDM and BMDM processes are used. Each pair has a different structuring element. The results which are achieved using each pair, as described above, are compared in a scale space.

Reference is now made to FIGS. 11A and 11B which depict comparative graphs. FIG. 11A depicts a one-dimensional projection of the pixel values on the Y axis. FIG. 11B depicts a one-dimensional projection of the pixel values on the Y axis which has been smoothed, using a TV smoothing process. These curves are named the original/smoothed vertical feature sinks curve.

Preferably, the GMDM is searched for facial features. Each row of pixels of the GMDM is separately summed. Since the pixels that represent the eyes and the mouth are the darkest and deepest pixels of the GMDM, the values of the summed rows that comprise the eyes and mouth pixels should be lower than the values of other GMDM rows. FIG. 11A depicts the output of a one-dimensional projection of the pixel values on the Y axis. Each asterisk represents a row with substantially low pixel gray level values, a potential feature sink. As depicted in FIG. 11A, the rows which are positioned in the vicinity of the asterisks lie along bottom portions of the curve. These portions of the curve represent a series of potential facial features. Preferably, the rows with substantially low pixel gray level values, the sinks, are stored in a potential facial feature array.

Preferably, since the one-dimensional projection process generates a noisy output, as depicted in FIG. 11A, a TV smoothing process is performed in order to smooth the outcome, and the smoothed version of the graph shown in FIG. 11B. The TV smoothing filter is used, as described above. Preferably, the λ value is equal to 50.

Reference is now made to FIG. 12, which is a flowchart that illustrates an eye strip detection process, according to a preferred embodiment of the present invention. As described above, the first step, as shown at 171, is to generate a potential facial feature array that comprises the outcome of the one-dimensional projection on the Y axis of the gray level face segment.

Then, preferably, as shown at 172, an eye level function (a function which takes values and puts them into a certain order) is used to sort members of the potential facial feature array in ascending order, according to the one-dimensional projection values (vertical feature sinks) of the array members. For example, the substantially low values in columns 44, 67, 86, 104 and 123 of the graph in FIG. 11A are stored in an array in the following order: 44, 123, 86, 104, and 67. Then, as shown at step 173 of FIG. 12, the member of the ordered array is analyzed in order to determine whether the row is part of the eye strip. During the analysis, a potential eye strip is defined. A predetermined equal number of rows from both the upper and the lower surrounding areas of the analyzed row comprise the potential eye strip. After the strip has been defined, the columns of the potential eye strip are separately summed to generate a one-dimensional projection (vertical feature sink) on the X axis of the potential eye strip.

Preferably, the one-dimensional projection (vertical feature sink) on the X axis of the potential eye strip is analyzed using an eye match function. The eye match function matches the one-dimensional projection (vertical feature sink) on the X axis of the potential eye strip with predefined characteristics of a typical area containing a pair of eyes and a bridge of the nose. For example, a predefined characteristic of the eye match function is a pattern of a peak positioned in between two shallow bottoms, as depicted in FIG. 13. Preferably, as shown at 174, the eye match function assesses the proximity of the peak in the graph and the two shallow bottoms in the graph to the center symmetry centerline which has been previously identified, as described above, to determine that the positions of the eyes and nose correspond with the centerline.

Reference is now made to FIG. 13 which depicts a typical outcome of one-dimensional projection on the X axis of a typical eye strip. The eyes are represented as bottoms in the graph 150. The bridge of the nose area is represented as a peak in the graph 151 which is positioned in between the two bottoms 150 that represent the eyes.

Reference is now made, once again, to FIG. 12. If the match between the potential eye strip and the predefined characteristics has failed, if there are other members of the array which have not yet been matched, at shown at 176, then the next member of the ordered array is matched, as described above, using the eye match function. This process is cyclic and is carried on, as shown at 179, until a match is achieved.

Clearly, the eye strip cannot be located below the mouth strip and the nose line. As described above, each member of the array of potential facial features comprises a one-dimensional projection of rows of pixels. Hence, as shown at 177, the member of the potential array of feature sink that represents the eye strip cannot be the last member of the potential array of feature sink or there would be no member corresponding to the mouth. Preferably, the position of the potential eye strip is taken into consideration, such that members which are not positioned in the expected position of the eyes are disregarded. If none of the potential eye strips which have been identified, as described above, matches the predefined characteristics, the whole process fails, as shown at 178. After a match has been found, as shown at 175, other facial features are still to be identified.

Reference is now made to FIG. 14, which is a flowchart that illustrates the mouth strip detection process, according to a preferred embodiment of the present invention. Since the nose and the mouth are located below the eyes, the original ordering of the potential facial feature sink array may be used to estimate their position, as shown at 181.

Firstly, as shown at 183, the row members of the potential array of feature sink, which are located below the eye strip, are analyzed to identify the mouth. Preferably, the analysis is done using a mouth match function. In use, the mouth match function marks the mouth strip. The mouth strip is defined as a batch of rows comprising a predetermined equal number of rows from both the upper and the lower surrounding area of the analyzed row member of the potential array of feature sink. After the mouth strip has been defined, the columns of the mouth strip are separately summed to create a one-dimensional projection of the potential mouth strip on the X axis. FIG. 15 depicts a typical one-dimensional projection of a mouth strip. The mouth match function matches the one-dimensional projection of the potential mouth strip with predefined characteristics of a mouth.

For example, a predefined characteristic of the mouth match function is a mild peak in the graph with a sunken bottom in its apex. The mild peak in the graph is positioned in between two shallow bottoms, as depicted in FIG. 15.

Preferably, as shown at 184 in FIG. 14, the mouth match function assesses the proximity of the two bottoms in the graph to the center symmetry centerline. If the match between the potential mouth strip and the predefined characteristics has failed, as shown at 189, the next one-dimensional projection on the Y axis of a row which is listed in the potential array of feature sink is matched, as described above, using the mouth match function. As shown in 186, if there are other members of the array which have not yet been matched, then the next member of the array is matched, as shown at 189. This process is cyclic and is carried on until a match is achieved.

A member of the potential facial feature sink array which has been identified as part of the eye strip cannot be further identified as a part of the mouth strip. Clearly, a member of the potential facial feature sink array, which is positioned above the eye strip, cannot be identified as part of the mouth strip either.

If none of the potential mouth strips which have been identified as described above match the predefined characteristics, the whole process fails, as shown at 188. After a match has been found, as shown at 185, the segments that comprise the mouth and the eyes can be identified.

Preferably, since the nose may not appear on the GMDM, the identified positioning of the mouth and the eyes may be used together with the positioning of the centerline to determine its estimated or approximate positioning. As described above, it is known that the nose is approximately bisected by the centerline, delimiting the potential position of the nose to a limited space. In addition, it is known that the nose has to be positioned between the eyes and the mouth. Moreover, since the ratio of the distances between different facial features is relatively similar among different faces, the distance between the eyes and mouth may be used to determine the positioning of the nose. Hence, the possible vertical positioning of the nose is also limited. If a minimum of the GMDM Y projection, as described above, is in near proximity to the expected position of the nose and does not correspond to either the mouth or to the eyes, the position of the nose will be taken to be as where the minimum is found.

Preferably, the BMDM is used to identify the mouth, the nose and the eye segments. The coordinates of the identified eye strip are used to define the BMDM area in which the clusters or blobs of pixels that represent the eyes should be (cluster analysis)

As described above, the BMDM comprises areas of pixels that represent the positions of the darkest and the deepest areas of pixels in the GMDM. The areas of pixels which represent the eyes have to be positioned on different sides of the identified vertical symmetry centerline. Aspect ratios, distances from the vertical symmetry centerline and other bio-morphological characteristics can be used to determine the compatibility of the areas to representing the eyes of the depicted face.

Preferably, the identified areas of pixels that delimit the eyes aid in horizontally delimiting the mouth area. The coordinates of the identified mouth strip are used to delimit the vertical positioning of the clusters of pixels in the BMDM that depict the mouth of the face. Typically, the mouth is divided by the centerline of the face, and the center of the eye areas may be used to delimit the horizontal positioning of the mouth area because the edges of the mouth should not exceed the centre of the eye area.

Preferably, the BMDM area in which the mouth area is located is in between two lines which are perpendicular to other lines which bisect the two areas of pixels that delimit the eyes of the face. Preferably, a horizontal nose line is determined according to the positioning of the centerline, the mouth and the eyes, as described above.

Reference is now made to FIGS. 16A and 16B which depict the facial feature segments which have been identified. FIG. 16A depicts an exemplary gray level face segment 191 which has been identified by the face detection process and facial features which have been identified thereby. FIG. 16B depicts an exemplary digital image that comprises a human face. The clusters of pixels 192 which delimit the facial segments of the eyes are the identified facial features. The centerline 194, the horizontal nose line 193, the clusters of pixels 192 of the eyes and the cluster of pixels 195 of the mouth are depicted in both figures. The depicted facial feature segments are the output of the process and can be used as inputs for different applications such as face recognition applications other image processing applications.

Reference is now made to FIG. 17 which depicts a human facial feature finding device according to a preferred embodiment of the present invention. The human facial feature finding device 214 is adapted to receive a digital image 251 from an image sensor via a designated image input module 252. The received digital image comprises a human face. Preferably, the image sensor is a complementary metal oxide semiconductor (CMOS) sensor or a charged coupled device (CCD) sensor.

The digital image is transferred to a face detection module 253. The face detection module is used to identify a face segment from the digital image. The face segment delimits the face which is depicted in the digital image. The delimitation enhances a faster analysis of the face area and reduces the computational complexity of detecting facial features. The candidate face region is transferred to a face bisector module 250. The bisector module 250 is used to identify a centerline that bisects the face into two approximately symmetric sides. The centerline and the face segment are transferred to a facial feature detection module 255. The facial feature detection module 255 is used to segment facial features from the face segment. In order to segment the facial features, the facial feature detection module 255 may use the centerline to determine an estimated position of each facial feature. Based upon the estimation, the identified facial feature segments 256 are output. Preferably, the output comprises Bounding Boxes around Facial Features that represent the regions of the facial features in relation to the digital image. In another embodiment of the present invention the output comprises a series of bitmaps, each bitmap representing a different facial feature segment.

It is expected that during the life of this patent many relevant devices and systems will be developed and the scope of the terms herein, particularly of the terms digital image, image sensors, memory, module, converter, filter, and virtual window are intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method for facial feature detection, said method comprising:
   a) receiving a digital image, said digital image comprising a plurality of color pixels, each one of said color pixels comprising color information;
   b) identifying a candidate face region based on said color information;
   c) using symmetry within said candidate face region to identify a centerline to substantially bisect a human face section within said candidate face region; and
   d) using said centerline as a locator to segment facial feature regions of said human face section, the method further comprising iteratively defining said centerline by adopting one of a plurality of lines that most symmetrically divide said human face section, said adopting one of a plurality of lines comprising:
      defining a pair of corresponding frames for each one of said plurality of lines wherein, for each line, each pair of corresponding frames delimits a pair of areas of color pixels from opposite sides of a respective line;
      comparing said two corresponding frames of each one of said plurality of potential lines to determine a symmetry level value; and
      using said symmetry level value of each one of said plurality of potential lines to identify said centerline, said symmetry level value represents a joint probability of one of said plurality of potential lines to be said centerline, thereby converting said digital image into detected features.

2. The method of claim 1, further comprising:
   generating one member of the group comprising a Gray Level Morphological Deep Map (GMDM) based on said human face section and a Binary Morphological Deep Map (BMDM) based on said GMDM.

3. The method of claim 2, wherein said color information represents hue level of a related field of view.

4. The method of claim 3, wherein the lateral borders of said human face section are determined based on said hue level of said pixels of each column of said digital image.

5. The method of claim 3, wherein the upper and lower borders of said human face section are determined based on said hue level of said pixels of each row of said digital image.

6. The method of claim 2, further comprising a step between said step (b) and said step (c) of preparing a morphological map of said human face section based on said color information of said plurality of pixels, and wherein said segmenting said facial feature regions comprises using said morphological map.

7. The method of claim 2, wherein said color information comprises Red-Green-Blue (RGB) color coordinates; the method further comprising a step (a1) between said step (a) and said step (b) of converting said color information from RGB color coordinates to one member of the group consisting of: Hue-Saturation-Value (HSV) color coordinates, CIE L*a*b* (CIELAB) color coordinates and YCbCr color coordinates.

8. The method of claim 7, further comprising a step between said step (a1) and said step (b) of preparing a new digital image by shifting a contrast filter to scan an overall region of said digital image while changing the level of said color information at a predetermined rate.

9. The method of claim 2 further comprising a step between said step (b) and said step (c) of converting the color coordinates of said color information to gray value color coordinates.

10. The method of claim 2, wherein said identifying in step (b) comprises the following steps:
  i) separately analyzing said color information of each column of pixels of said digital image;
  ii) separately analyzing said color information of each row of pixels of said digital image; and
  iii) using the outcome of said step (i) and said step (ii) to identify said human face section.

11. The method of claim 2, wherein said centerline is iteratively defined by adopting one of a plurality of lines that most symmetrically divide said human face section.

12. The method of claim 11, wherein said adopting one of a plurality of lines comprises:
  defining a pair of corresponding frames for each one of said plurality of lines wherein, for each line, each pair of corresponding frames delimits a pair of areas of pixels from opposite sides of a respective line;
  comparing said two corresponding frames of each one of said plurality of potential lines to determine a symmetry level value; and
  using said symmetry level value of each one of said plurality of potential lines to identify said centerline.

13. The method of claim 2, wherein said centerline of step (c) is identified according to the following steps:
  i) segmenting a side template from a first side of said human face section;
  ii) generating a mirrored side template based on said side template;
  iii) matching said mirrored side template to at least one equally shaped area from another portion of said human face section; and
  iv) using the positioning of said side template and said mirrored side template to identify said centerline.

14. The method of claim 2, wherein said segmenting of step (c) is done using said GMDM.

15. The method of claim 2, wherein said segmenting of step (c) is performed according to the following steps:
  i) separately analyzing said color information of each row of pixels of said human face section;
  ii) using the outcome of said step (i) to identify a set of potential facial feature strips;
  iii) separately analyzing said color information of each column of pixels of said set of potential facial feature strips; and
  iv) using the outcome of said step (iii) to identify at least one facial feature segment that delimits the area of a facial feature.

16. The method of claim 1, wherein said color information represents hue level of a related field of view.

17. The method of claim 16, wherein the lateral borders of said candidate face region are determined based on said hue level of said color pixels of each column of said digital image.

18. The method of claim 16, wherein the upper and lower borders of said candidate face region are determined based on said hue level of said color pixels of each row of said digital image.

19. The method of claim 1, further comprising a step between said step (c) and said step (d) of preparing a morphological map of said face segment based on said color information of said plurality of color pixels, and wherein said segmenting said facial feature regions comprises using said morphological map.

20. The method of claim 19, wherein said identifying in step (b) comprises scanning the overall region of said digital image to identify a cluster of said color pixels that complies with a predefined rule.

21. The method of claim 20, wherein said predefined rule is one member of the group consisting of: a statistical rule, a dynamic rule, a static rule, a deterministic rule, and an event driven rule.

22. The method of claim 20, wherein said predefined rule defines pixels within a given range brightness level as facial skin pixels.

23. The method of claim 1, wherein said color information comprises Red-Green-Blue (RGB) color coordinates; the method further comprising a step (a1) between said step (a) and said step (b) of converting said color information from RGB color coordinates to one member of the group consisting of: Hue-Saturation-Value (HSV) color coordinates, CIE L*a*b* (CIELAB) color coordinates and YCbCr color coordinates.

24. The method of claim 23, further comprising a step between said step (a1) and said step (b) of preparing a new digital image by shifting a contrast filter to scan an overall region of said digital image while changing the level of said color information at a predetermined rate.

25. The method of claim 1 further comprising a step between said step (b) and said step (c) of converting the color coordinates of said color information to gray value color coordinates.

26. The method of claim 1 further comprising a step between said step (b) and said step (c) of dividing said candidate face region into at least two subimages, wherein said identifying in step (c) comprises correlating between the values of respective columns of pixels in each one of said subimages.

27. The method of claim 1, wherein said identifying in step (b) comprises the following steps:
  i) separately analyzing said color information of each column of pixels of said digital image;
  ii) separately analyzing said color information of each row of pixels of said digital image; and
  iii) using the outcome of said step (i) and said step (ii) to identify a candidate face region that delimits the area of said face.

28. The method of claim 27, wherein the outcome of said analyzing is smoothed using a Total Variation (TV) smoothing filter.

29. The method of claim 1, wherein said centerline of step (c) is identified according to the following steps:
   i) segmenting a side template from a first side of said face segment;
   ii) generating a mirrored side template based on said side template;
   iii) matching said mirrored side template to at least one equally shaped area from another portion of said face segment; and
   iv) using the positioning of said side template and said mirrored side template to identify said centerline.

30. The method of claim 29, wherein matching of said mirrored side template to at least one equally shaped area is done using a normalized-correlation process.

31. The method of claim 1, further comprising a step between said step (c) and said step (d) of generating a Gray Level Morphological Deep Map (GMDM) based on said face segment.

32. The method of claim 31, further comprising a step between said step (c) and said step (d) of generating a Binary Morphological Deep Map (BMDM) based on said GMDM.

33. The method of claim 32, wherein said segmenting of step (d) is done using said BMDM.

34. The method of claim 31, wherein said segmenting of step (d) is done using said GMDM.

35. The method of claim 1, wherein said segmenting of step (d) is performed according to the following steps:
   i) separately analyzing said color information of each row of pixels of said face segment;
   ii) using the outcome of said step (i) to identify a set of potential facial feature strips;
   iii) separately analyzing said color information of each column of pixels of said set of potential facial feature strips; and
   iv) using the outcome of said step (iii) to identify at least one facial feature segment that delimits the area of a facial feature.

36. The method of claim 35, wherein the outcome of said step (ii) is smoothed using a TV smoothing filter.

37. The method of claim 35, wherein the outcome of said step (iv) is smoothed using a TV smoothing filter.

38. The method of claim 35, wherein said color information is represented in gray level color space coordinates.

39. The method of claim 1, comprising:
   generating a gray level image based on said plurality of color pixels;
   generating a Gray Level Morphological Deep Map (GMDM) based on said gray level digital image; and
   using said GMDM as a locator to segment facial feature regions of said human face section, thereby to transform said image into detected facial features.

40. The method of claim 39 further comprising a step between said step (c) and said step (d) of generating a Binary Morphological Deep Map (BMDM) based on said GMDM; wherein said using of step d) is further done by using said BMDM.

41. The method of claim 39 further comprising a step between said step (a) and said step (b) of identifying a candidate face region based on said color information, wherein said gray level image is based on said candidate face region.

42. The method of claim 41 further comprising a step between said step (b) and said step (c) of using symmetry within said candidate face region to identify a centerline to substantially bisect a human face section within said candidate face region; wherein said using of step d) is done using said centerline as a locator to segment facial feature regions of said human face section.

* * * * *